(12) United States Patent
Solomon

(10) Patent No.: US 7,277,876 B2
(45) Date of Patent: Oct. 2, 2007

(54) DYNAMIC ADAPTIVE DISTRIBUTED COMPUTER SYSTEM

(75) Inventor: Neal Solomon, Oakland, CA (US)

(73) Assignee: Solomon Research LLC, Oakland, CA (US)

(*) Notice: Subject to any disclaimer, the term of this patent is extended or adjusted under 35 U.S.C. 154(b) by 429 days.

(21) Appl. No.: 11/040,945

(22) Filed: Jan. 21, 2005

(65) Prior Publication Data
US 2005/0177593 A1    Aug. 11, 2005

Related U.S. Application Data

(60) Provisional application No. 60/539,095, filed on Jan. 23, 2004.

(51) Int. Cl.
*G06F 15/00* (2006.01)
*G06F 15/18* (2006.01)

(52) U.S. Cl. ........................................ 706/62
(58) Field of Classification Search ............... 706/62; 707/102
See application file for complete search history.

(56) References Cited

U.S. PATENT DOCUMENTS 5,077,677 A * 12/1991 Murphy et al. ............... 706/62
6,233,545 B1 * 5/2001 Datig ............................ 704/2

OTHER PUBLICATIONS

Variable DEVS-variable structure modeling formalism: an adaptive computer architecture application Barros, F.J.; Mendes, M.T.; Zeigler, B.P.; AI, Simulation, and Planning in High Autonomy Systems, 1994. 'Distributed Interactive Simulation Environments'., Proceedings of the Fifth Annual Conference on Dec. 7-9, 1994 pp. 185-191.*

Adaptive computer-based training in electronic engineering Essenius, R.P.; Wissenburgh, C.; Computer Based Learning in Electronic Education, IEE Colloquium on May 10, 1995 pp. 5/1-5/3.*

Adaptive RF-photonic arbitrary waveform generator J. Chou; Y. Han; B. Jalali; Photonics Technology Letters, IEEE vol. 15, Issue 4, Apr. 2003 pp. 581-583 Digital Object Identifier 10.1109/LPT.2003.809309.*

(Continued)

*Primary Examiner*—David Vincent
*Assistant Examiner*—Michael B. Holmes
(74) *Attorney, Agent, or Firm*—Fenwick & West LLP

(57) ABSTRACT

A system, methods and apparatus are described involving the self-organizing dynamics of networks of distributed computers. The system is comprised of complex networks of databases. The system presents a novel database architecture called the distributed transformational spatio-temporal object relational (T-STOR) database management system (dbms). Data is continuously input, analyzed, organized, reorganized and used for specific commercial and industrial applications. The system uses intelligent mobile software agents in a multi-agent system in order to learn, anticipate, and adapt and to perform numerous functions, including search, analysis, collaboration, negotiation, decision making and structural transformation. The system links together numerous complex systems involving distributed networks to present a novel model for dynamic adaptive computing systems, which includes plasticity of collective behavior and self-organizing behavior in intelligent system structures.

1 Claim, 34 Drawing Sheets

| Level | Category |
|---|---|
| 7 | Functional Applications |
| 6 | Plasticity Behavior in Environmental Interaction |
| 5 | Plasticity Behavior in Intrasystemic Interaction |
| 4 | Multi-Agent System (MAS) and Intelligent Mobile Software Agents (IMSAs) |
| 3 | Distributed Transformational Spatio-Temporal Object Relational (D-T-STOR) dbms |
| 2 | Distributed Nodes |
| 1 | Microprocessor / Application Specific Integrated Circuit (ASIC) / Continuously Programmable Field Programmable Gate Array (CP-FPGA) |

OTHER PUBLICATIONS

Mobile adaptive CALL (MAC): a case-study in developing a mobile learning application for speech/audio language training Uther, M.; Zipitria, I.; Uther, J.; Singh, P.; Wireless and Mobile Technologies in Education, 2005. WMTE 2005. IEEE International Workshop on Nov. 28-30, 2005 p. 5 pp. Digital Object Identifier 10.1109/WMTE. 2005.46.*

The SDVM—an approach for future adaptive computer clusters Haase, J.; Eschmann, F.; Waldschmidt, K.; Parallel and Distributed Processing Symposium, 2005. Proceedings. 19th IEEE International Apr. 4-8, 2005 p. 8 pp. Digital Object Identifier 10.1109/IPDPS. 2005.432.*

Configuration merging for adaptive computer applications Kasprzyk, N.; van der Veen, J.; Koch, A.; Field Programmable Logic and Applications, 2005. International Conference on Aug. 24-26, 2005 pp. 217-222 Digital Object Identifier 10.1109/FPL. 2005.1515725.*

Adaptive computer systems Abbott, R.; Aerospace Conference Proceedings, 2002. IEEE vol. 4, 2002 pp. 4-1819-4-1824 vol. 4 Digital Object Identifier 10.1109/AERO.2002.1036894.*

An execution system for variable tutoring processes Volz, E.; Martens, A.; Seitz, A.; Computers in Education, 2002. Proceedings. International Conference on Dec. 3-6, 2002 pp. 559-563 vol. 1 Digital Object Identifier 10.1109/CIE.2002.1186005.*

Run-time power estimation in high performance microprocessors Joseph, R.; Martonosi, M.; Low Power Electronics and Design, International Symposium on, 2001. Aug. 6-7, 2001 pp. 135-140 Digital Object Identifier 10.1109/LPE.2001.945389.*

Adaptive system architectures Waldschmidt, K.; Parallel and Distributed Processing Symposium, 2004. Proceedings. 18th International Apr. 26-30, 2004 p. 147 Digital Object Identifier 10.1109/IPDPS.2004.1303130.*

Mobile adaptive CALL (MAC): an adaptive s/w for computer assisted language learning Uther, M.; Pushpendra Singh; Uther, J.; Pervasive Services, 2005. ICPS '05. Proceedings. International Conference on Jul. 11-14, 2005 pp. 413-416 Digital Object Identifier 10.1109/PERSER.2005.1506556.*

Knowledge-based adaptive computer control in manufacturing systems: a case study Lingarkar, R.; Liu, L.; Elbestawi, M.A.; Sinha, N.K.; Systems, Man and Cybernetics, IEEE Transactions on vol. 20, Issue 3, May-Jun. 1990 pp. 606-618 Digital Object Identifier 10.1109/21.57273.*

* cited by examiner

| Level | Category |
|---|---|
| 7 | Functional Applications |
| 6 | Plasticity Behavior in Environmental Interaction |
| 5 | Plasticity Behavior in Intrasystemic Interaction |
| 4 | Multi-Agent System (MAS) and Intelligent Mobile Software Agents (IMSAs) |
| 3 | Distributed Transformational Spatio-Temporal Object Relational (D-T-STOR) dbms |
| 2 | Distributed Nodes |
| 1 | Microprocessor / Application Specific Integrated Circuit (ASIC) / Continuously Programmable Field Programmable Gate Array (CP-FPGA) |

FIG._1

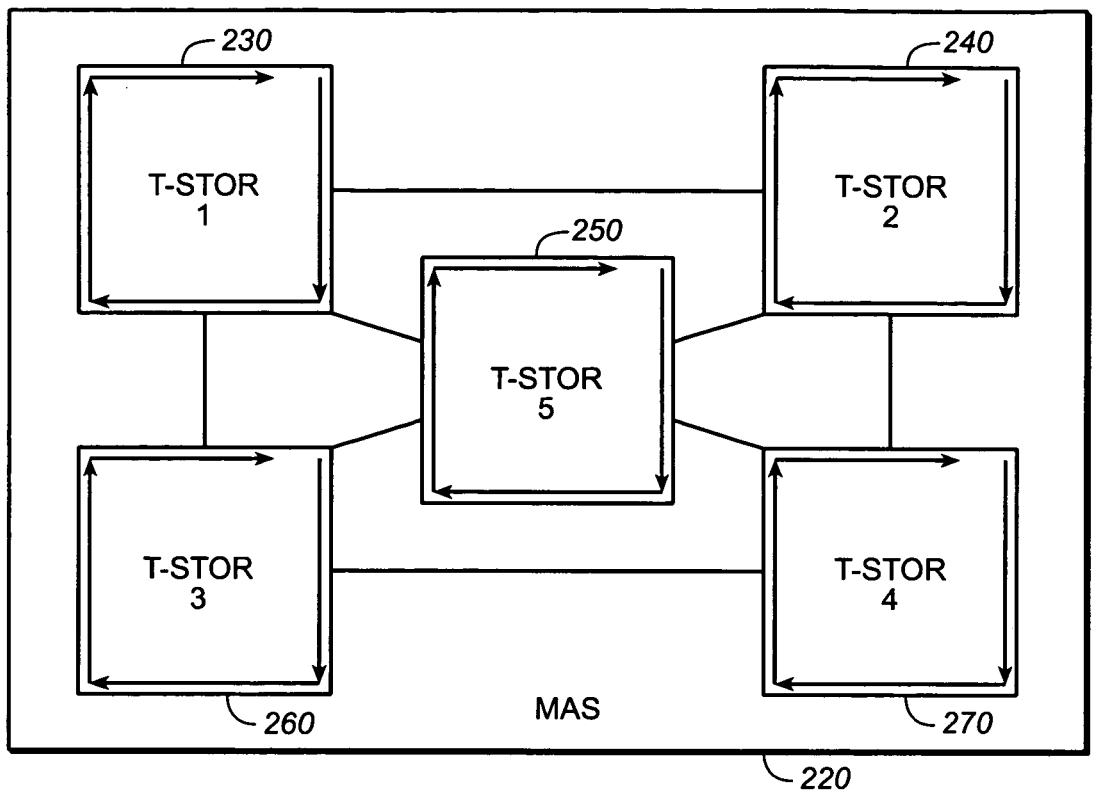
FIG._2
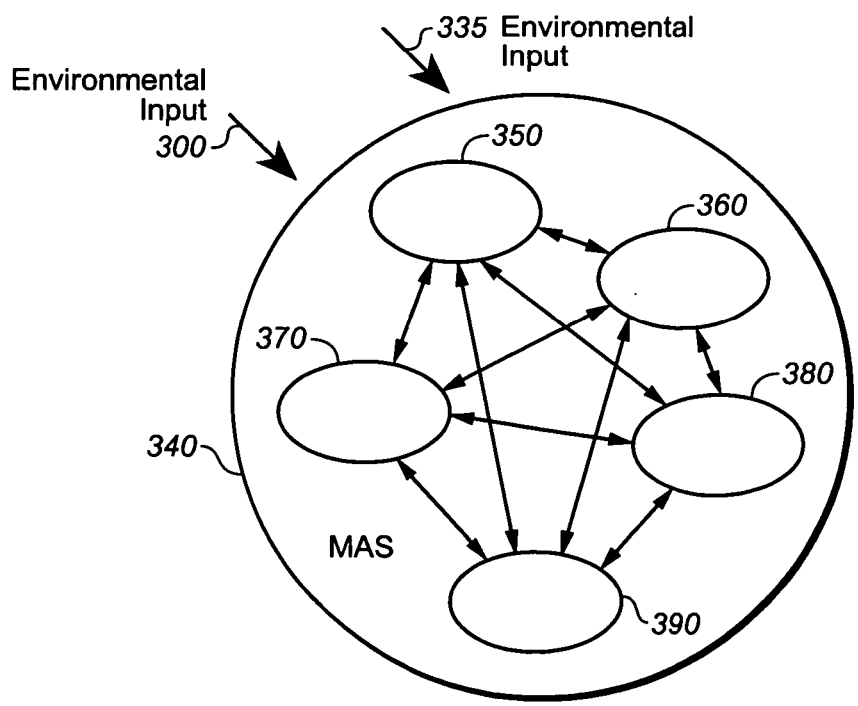
FIG._3

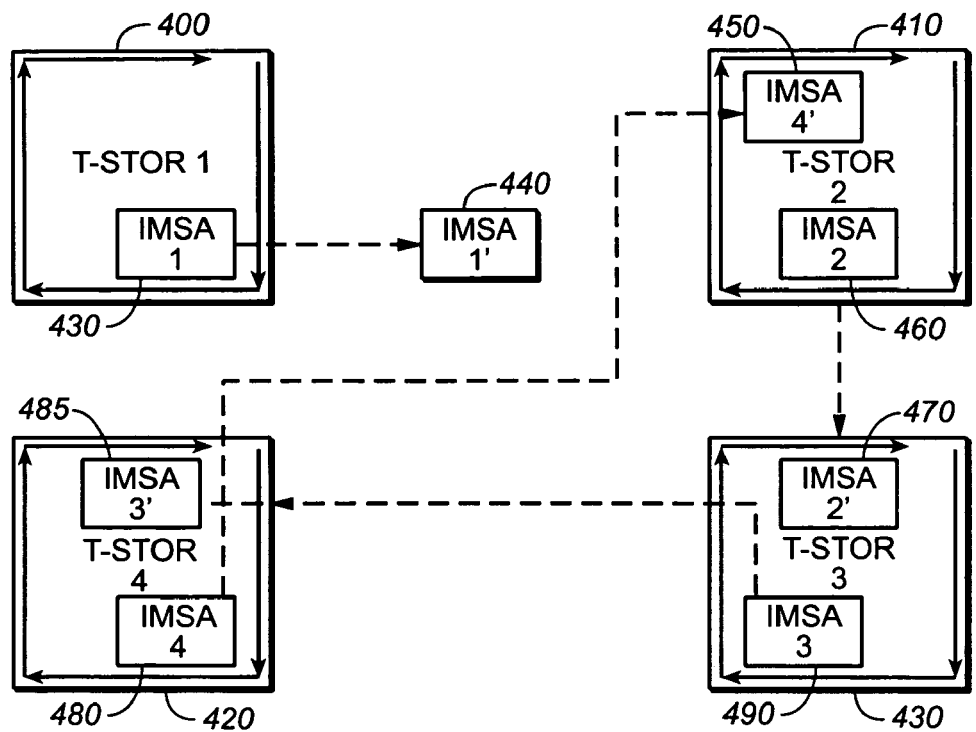
FIG._4
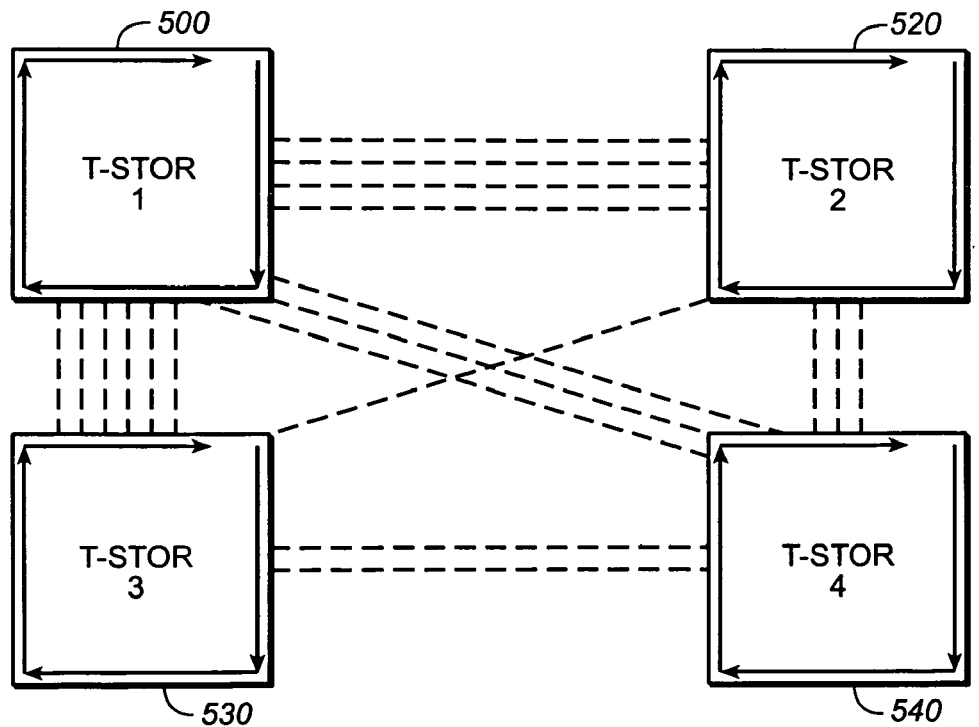
FIG._5

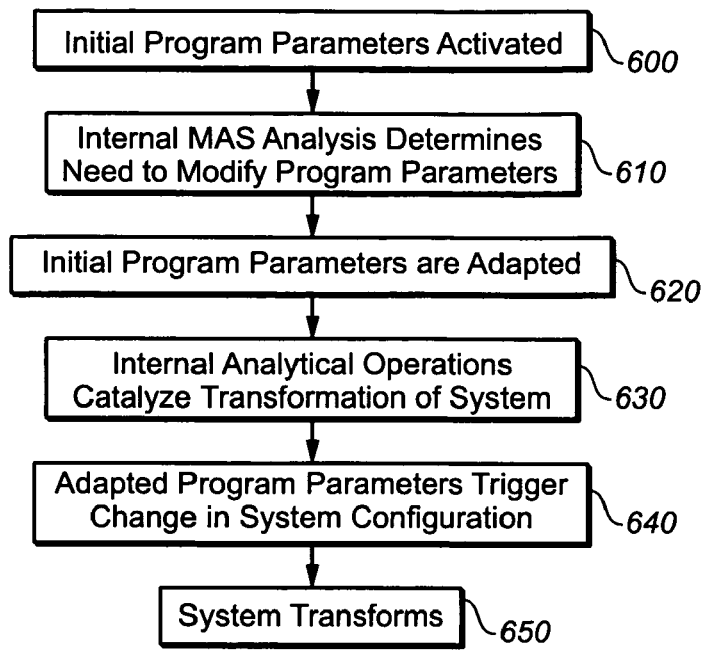
FIG._6
Phase I
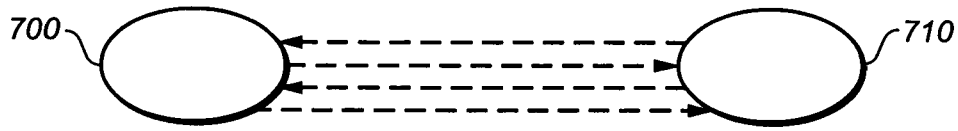
Phase II
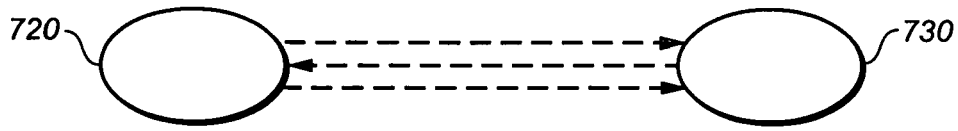
Phase III
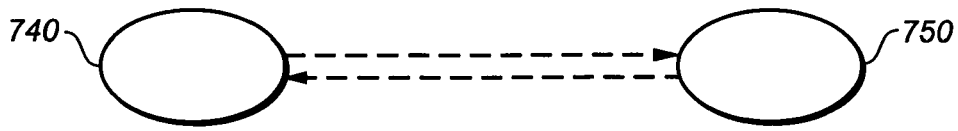
Phase IV
FIG._7

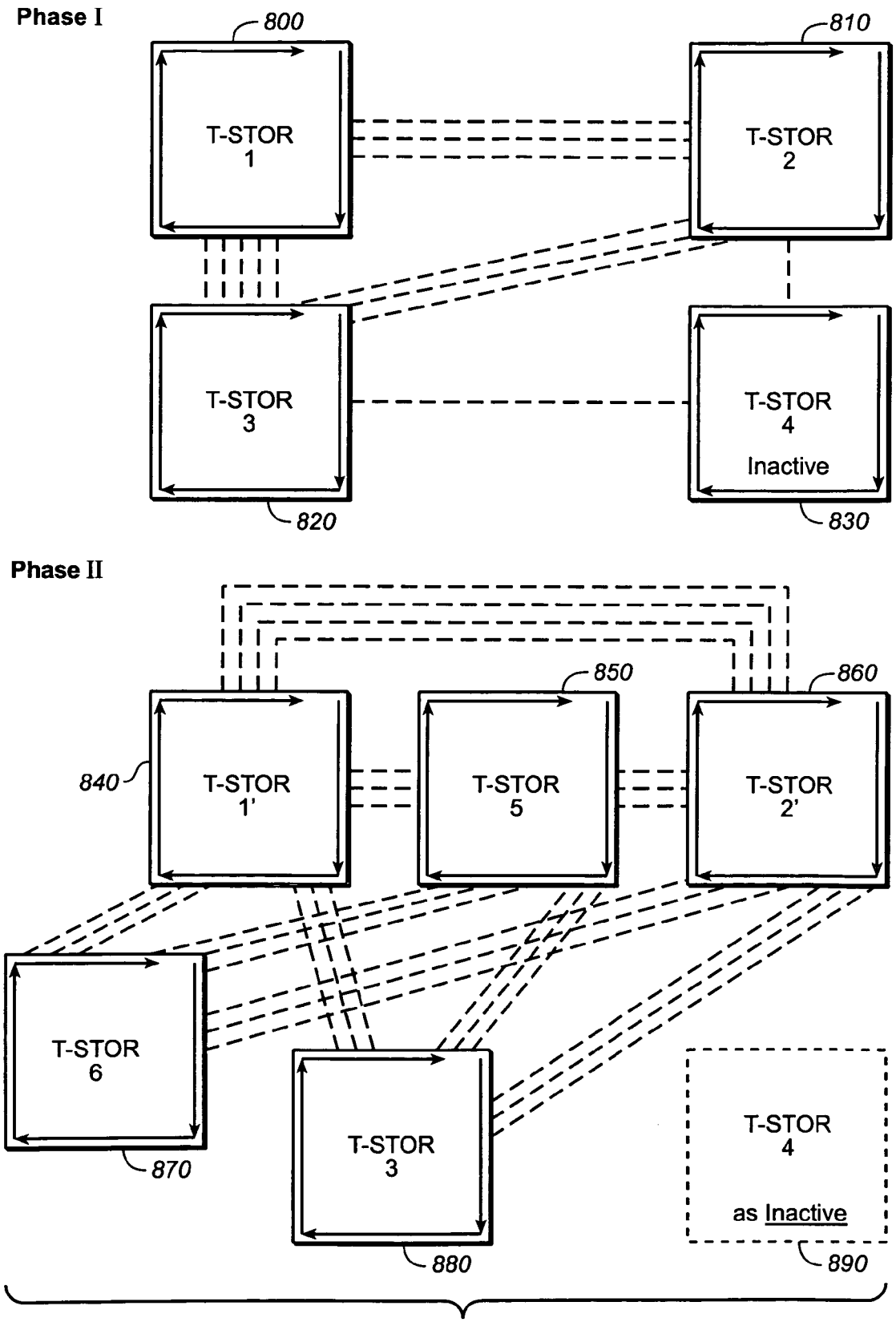
FIG._8

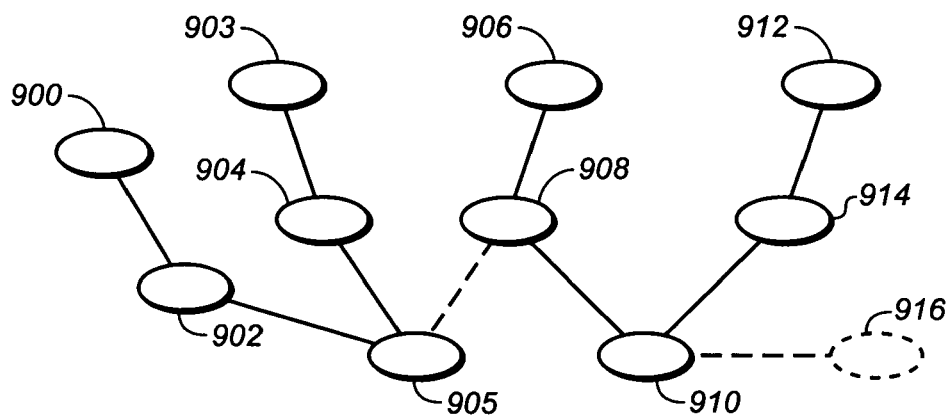
FIG._9A
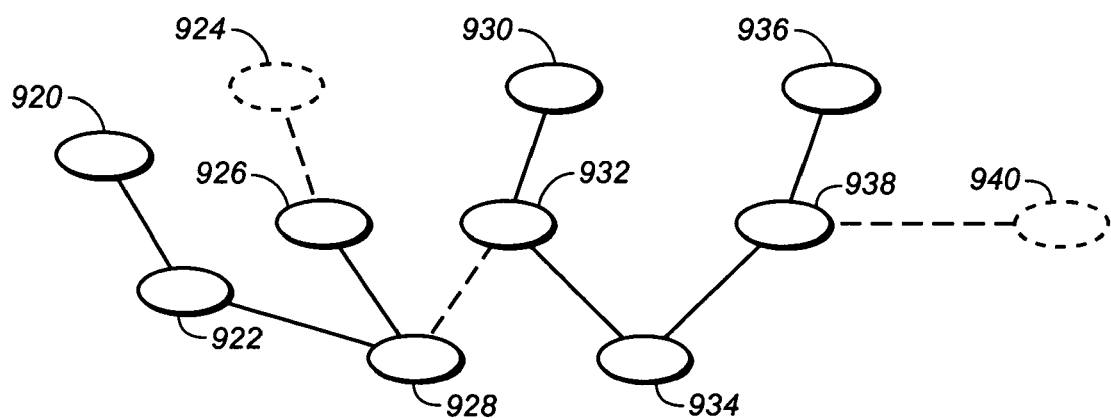
FIG._9B
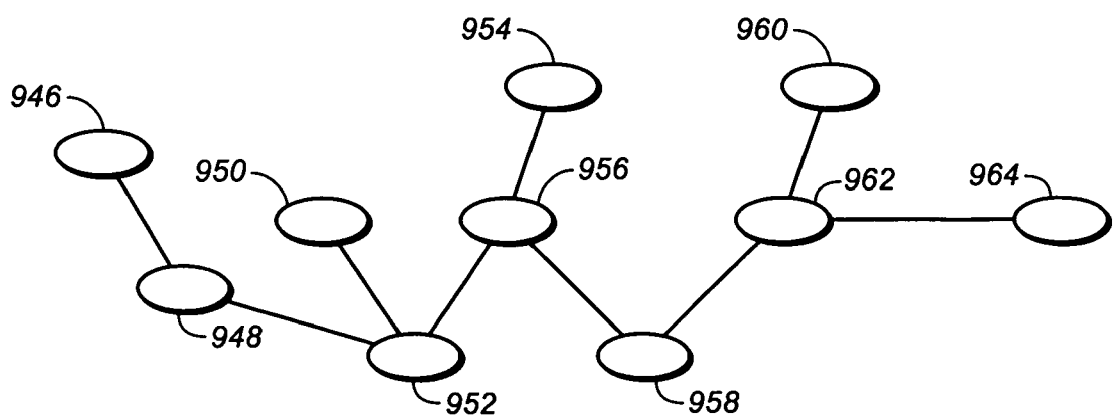
FIG._9C

Phase I
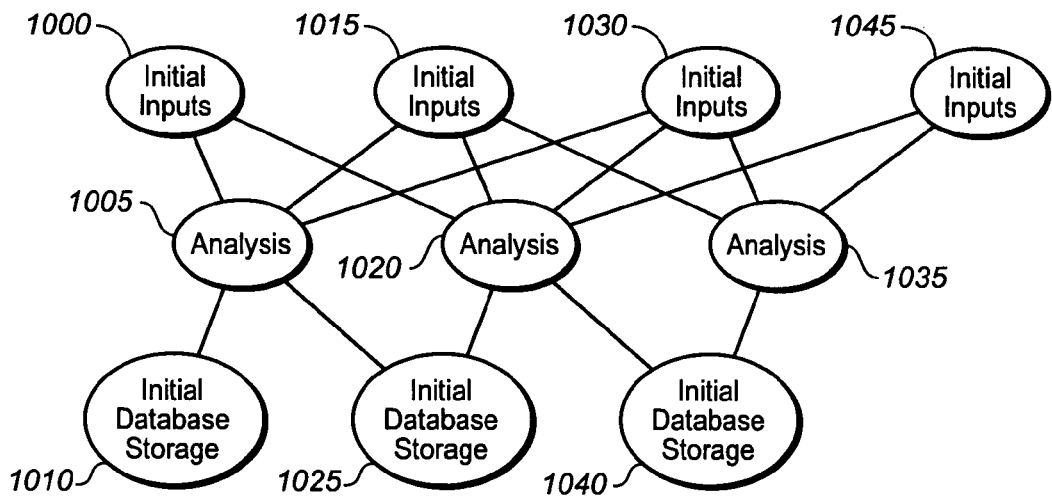
Phase II
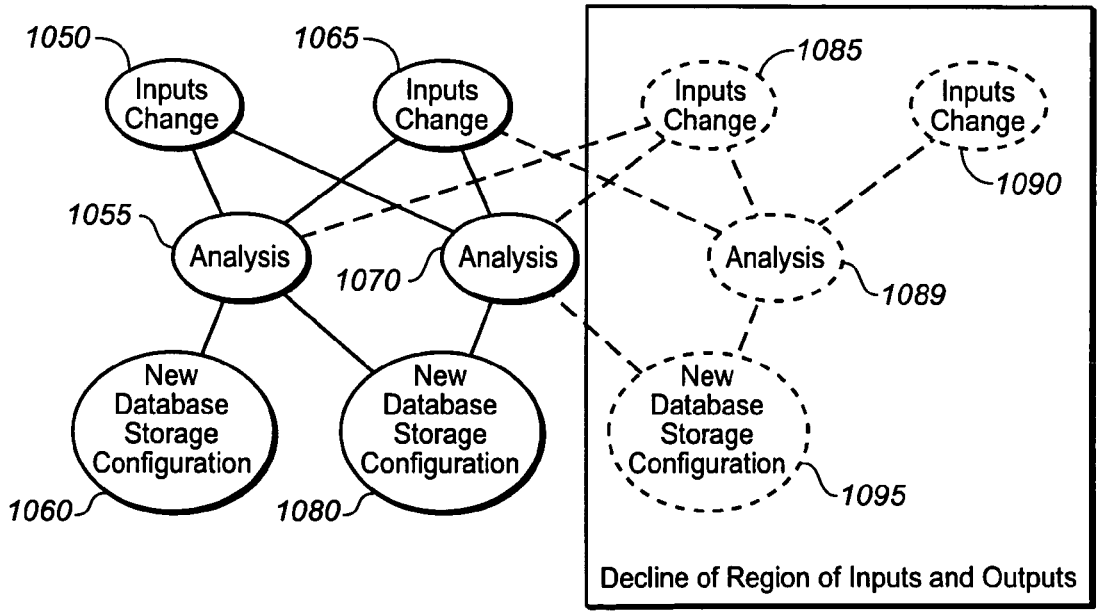
FIG._10

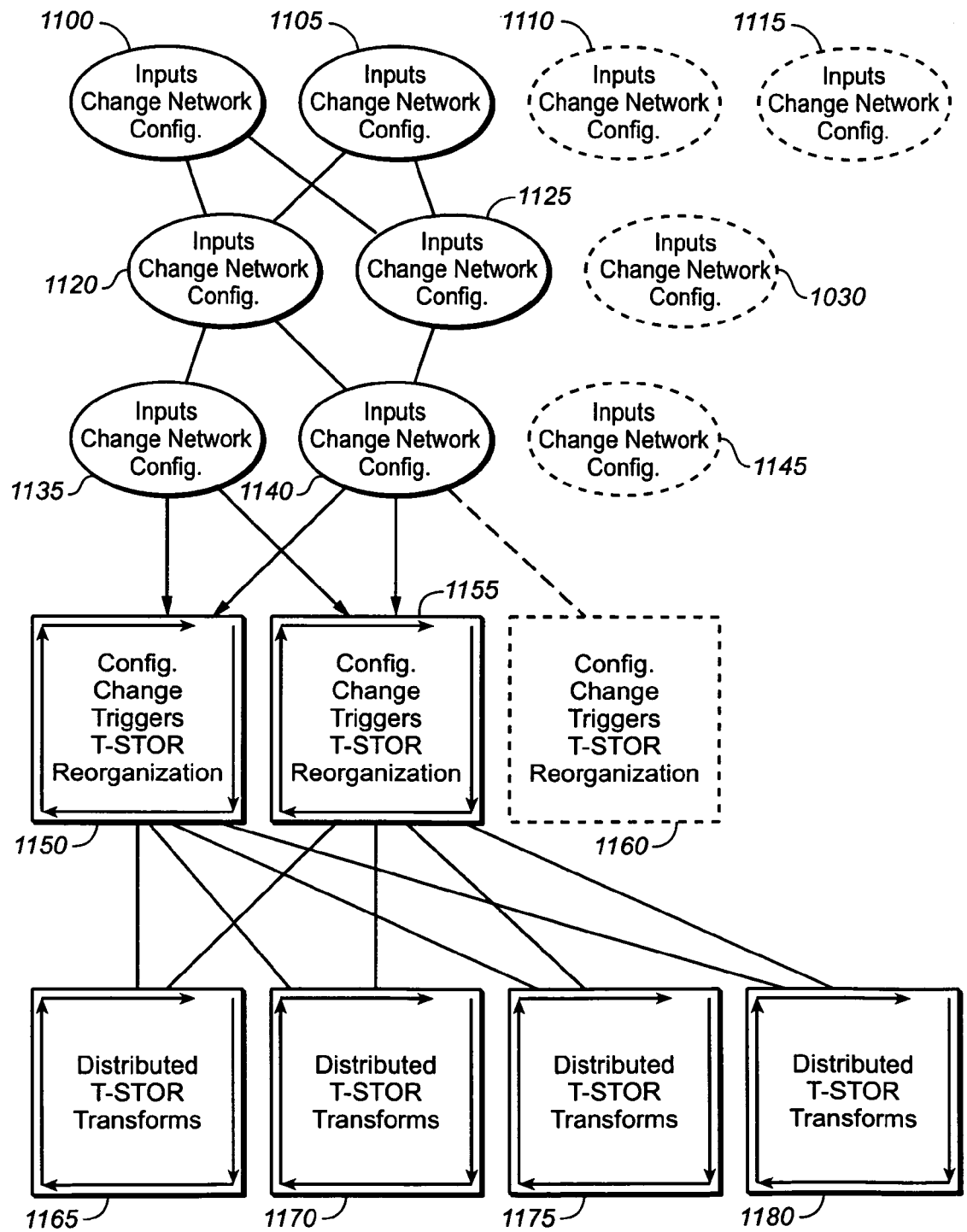
FIG._11

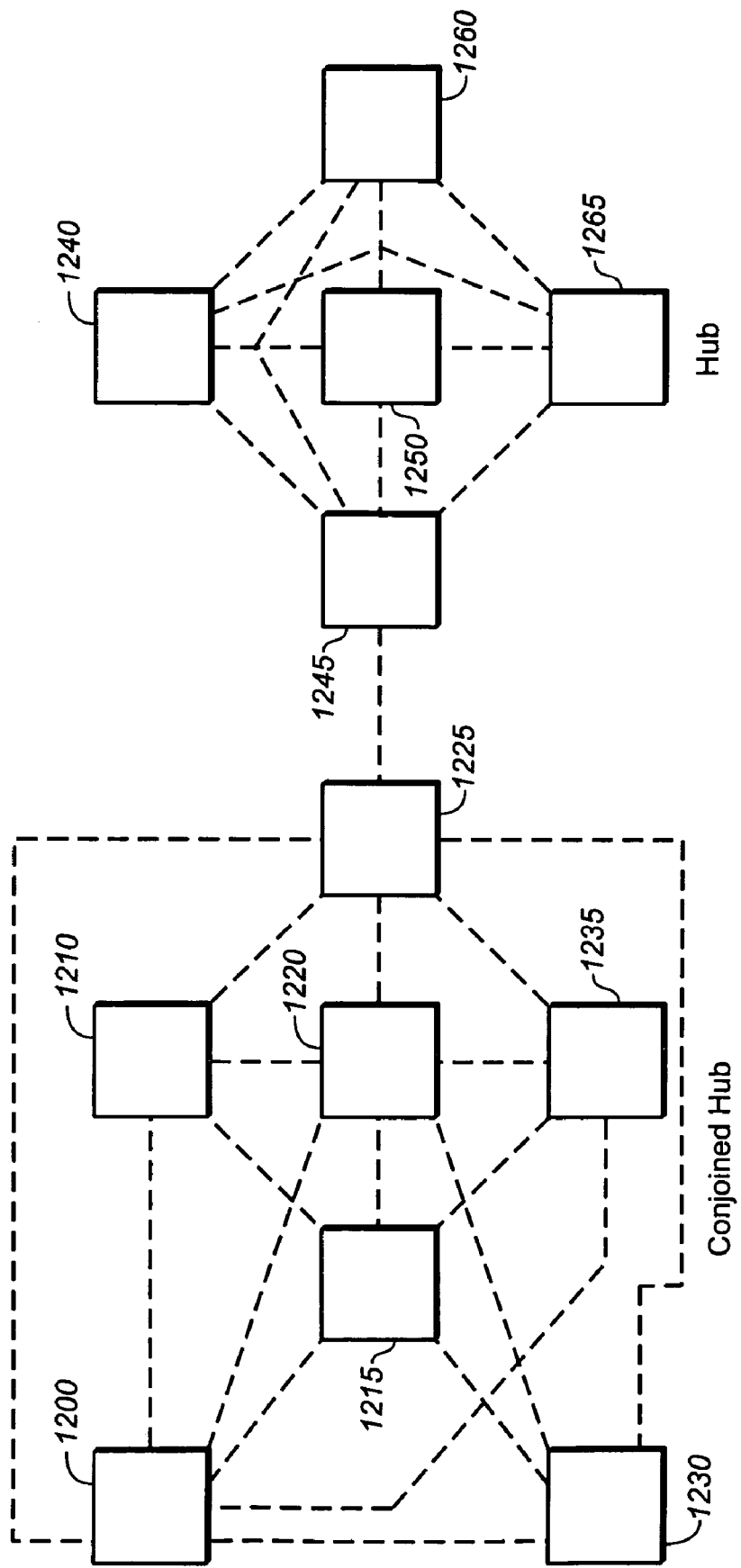
FIG._12

Phase I
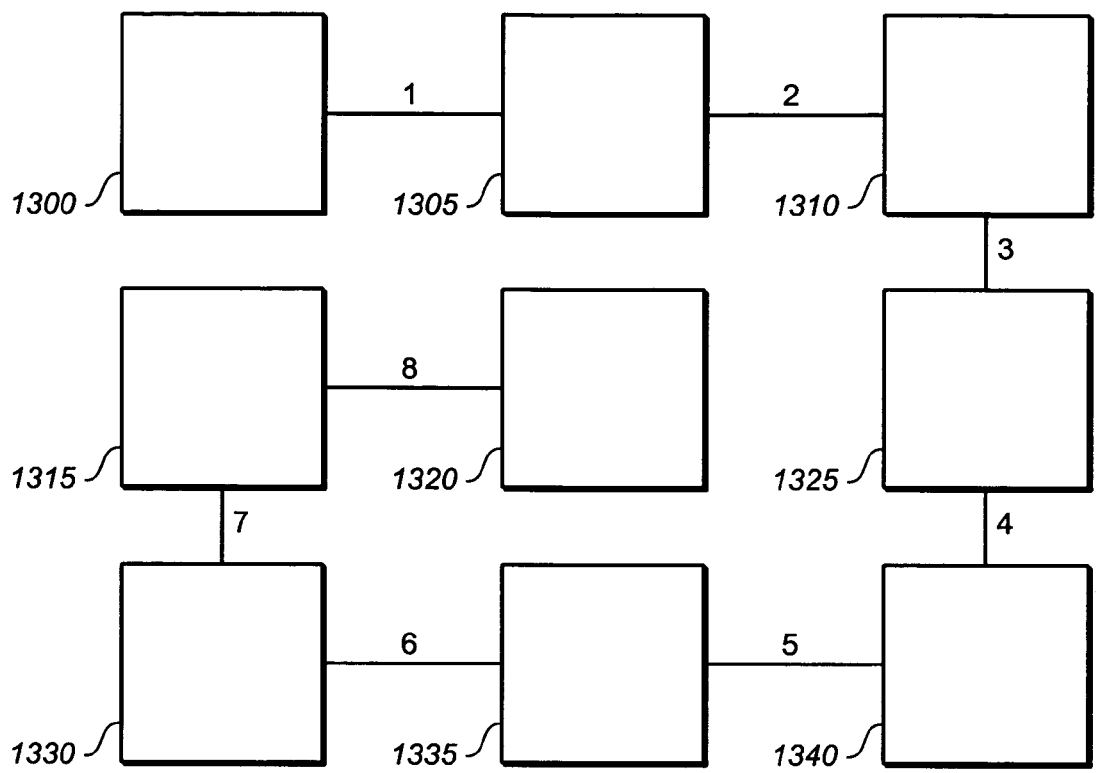
Phase II
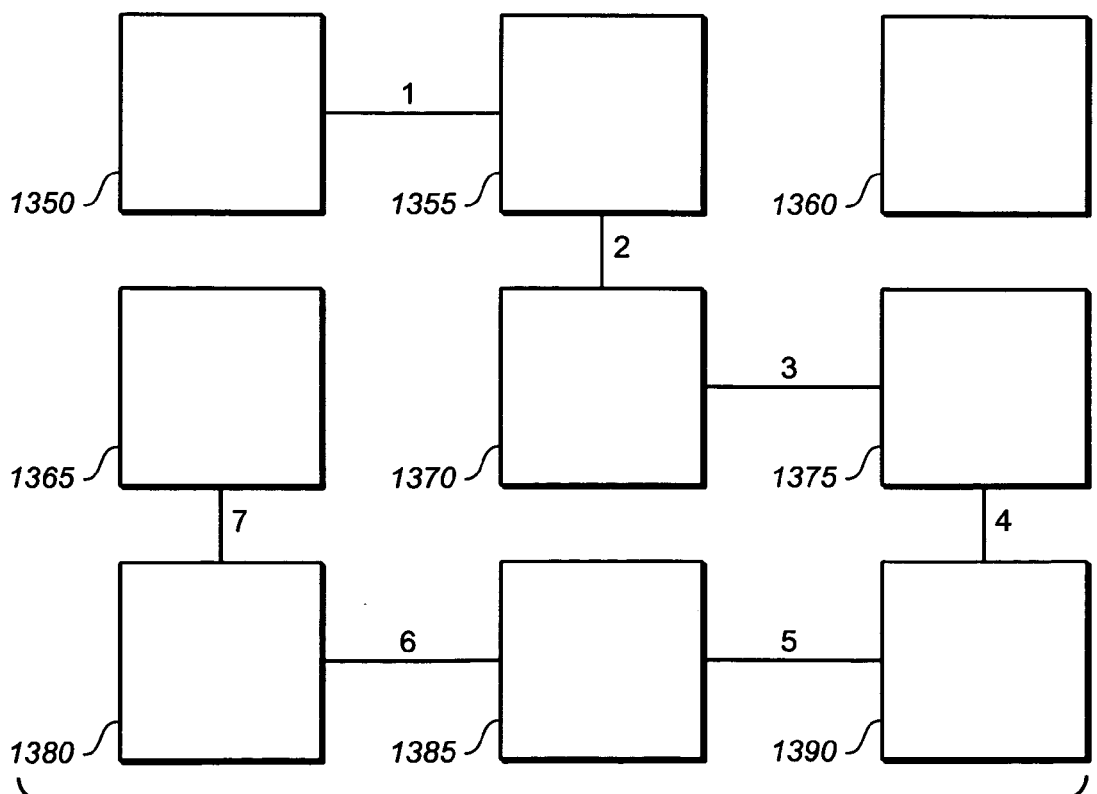
FIG._13

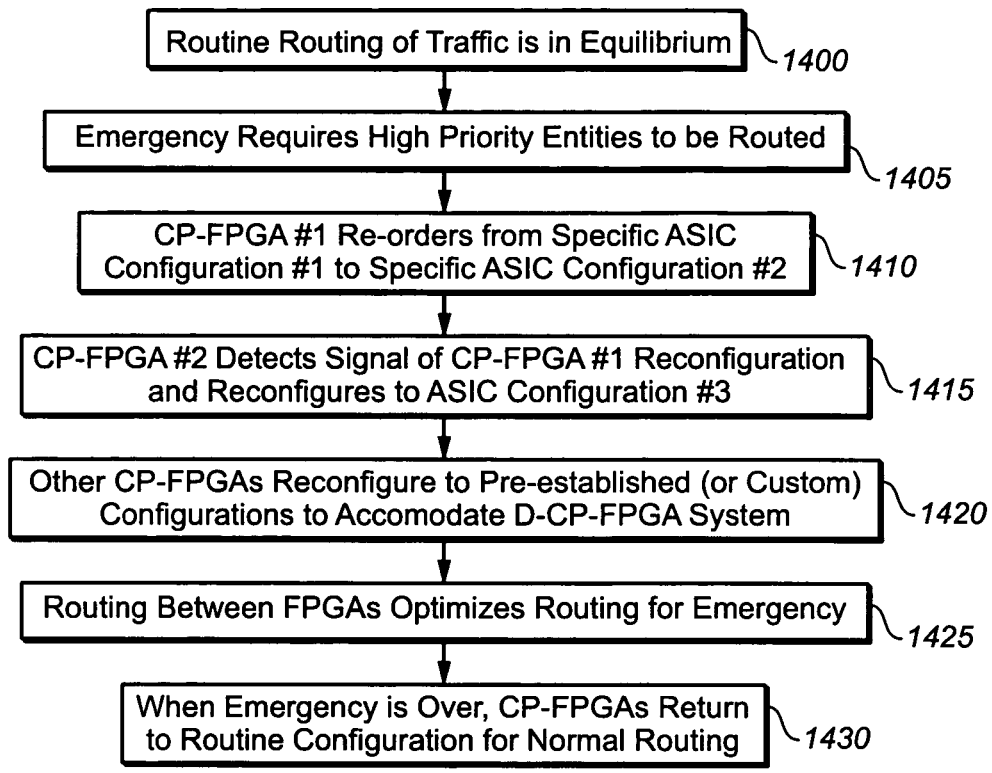
FIG._14
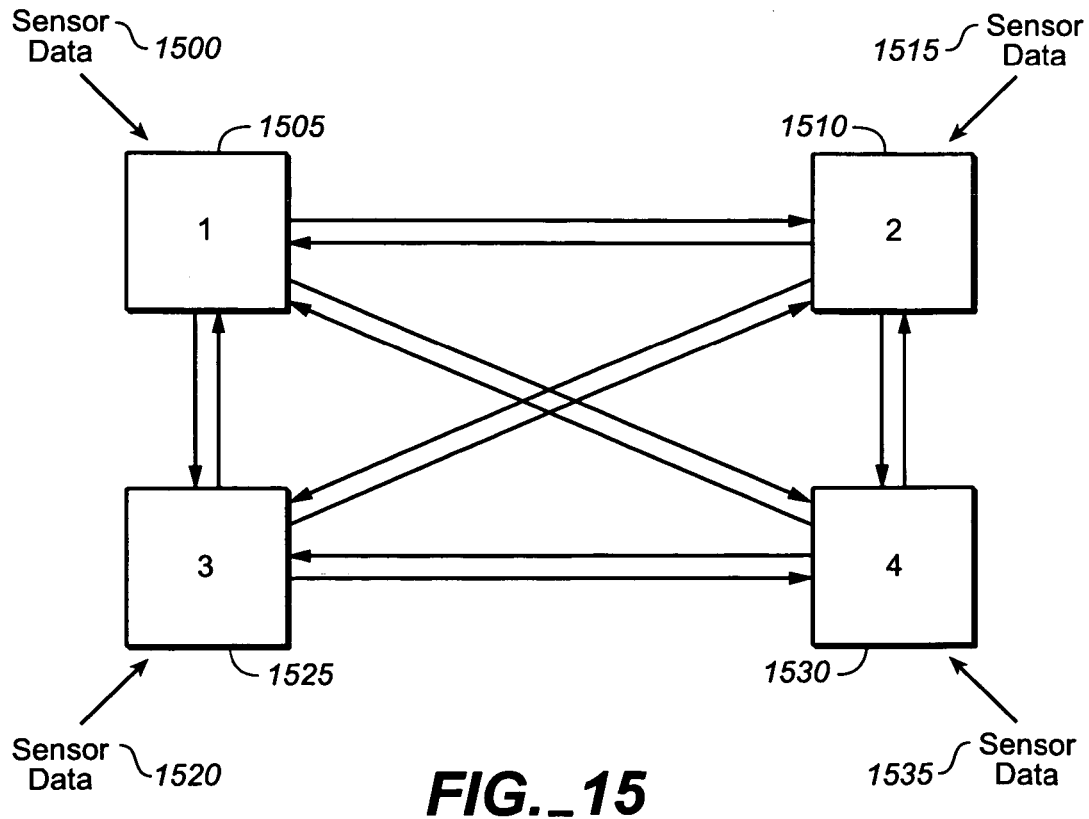
FIG._15

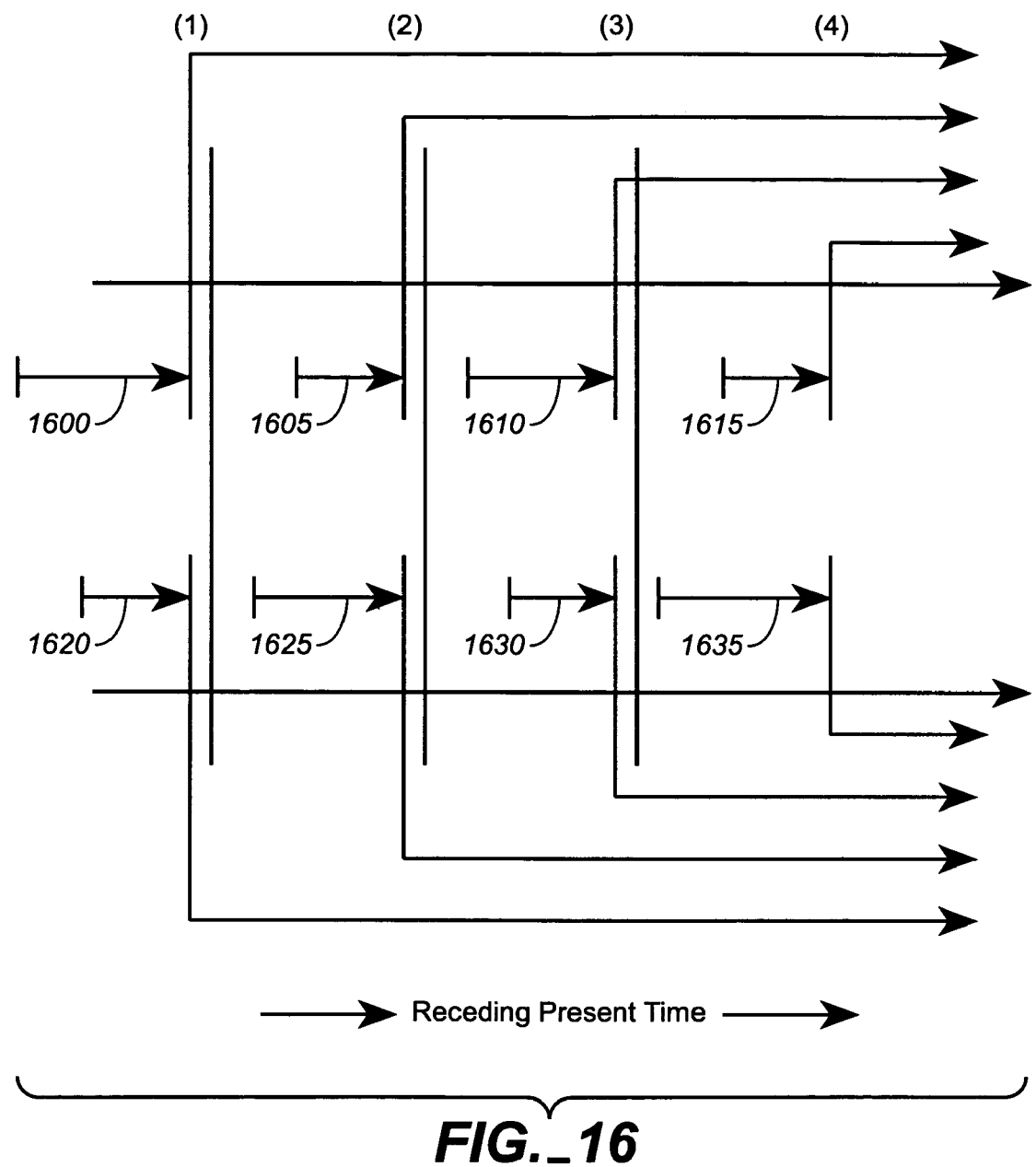
FIG._16

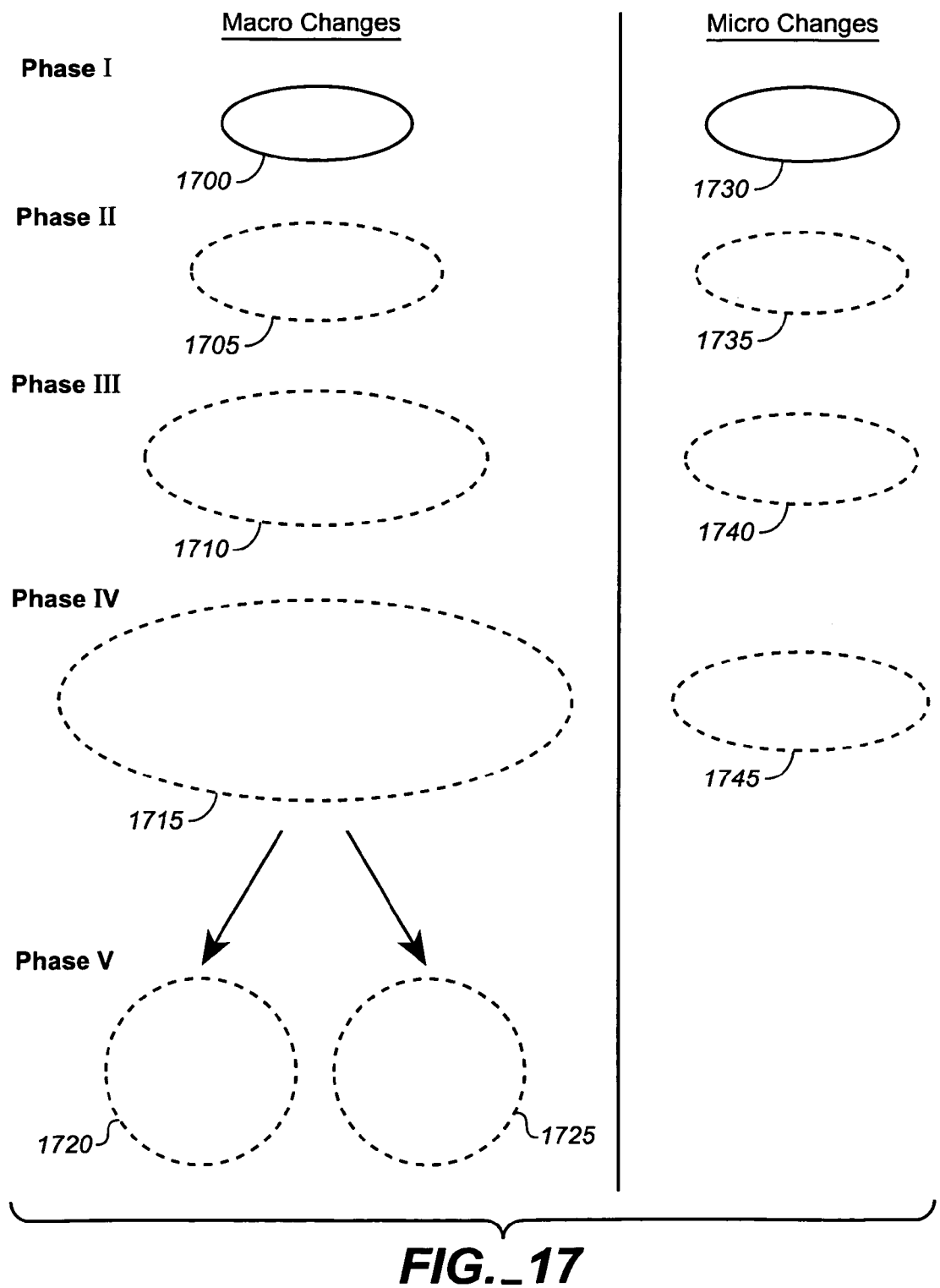
FIG._17

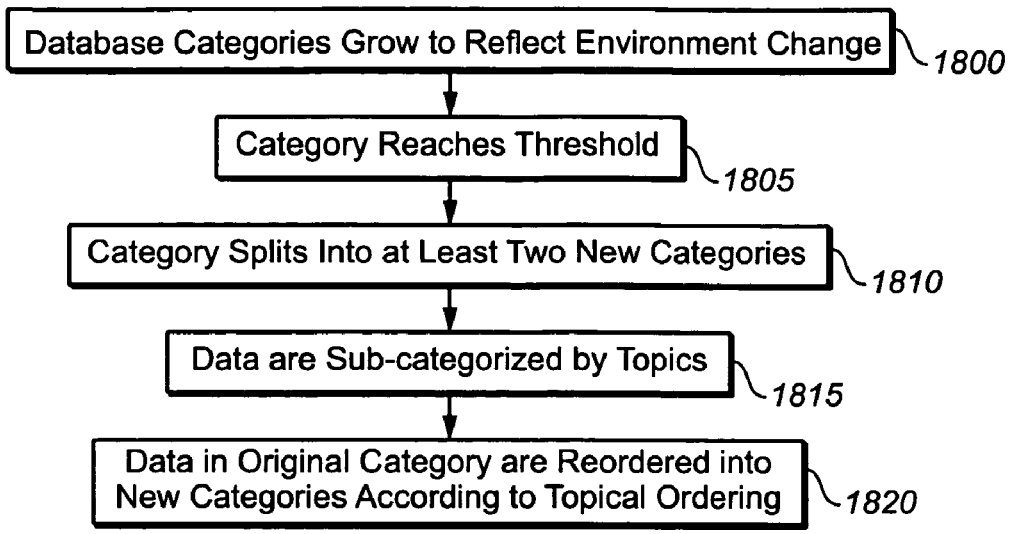
FIG._18
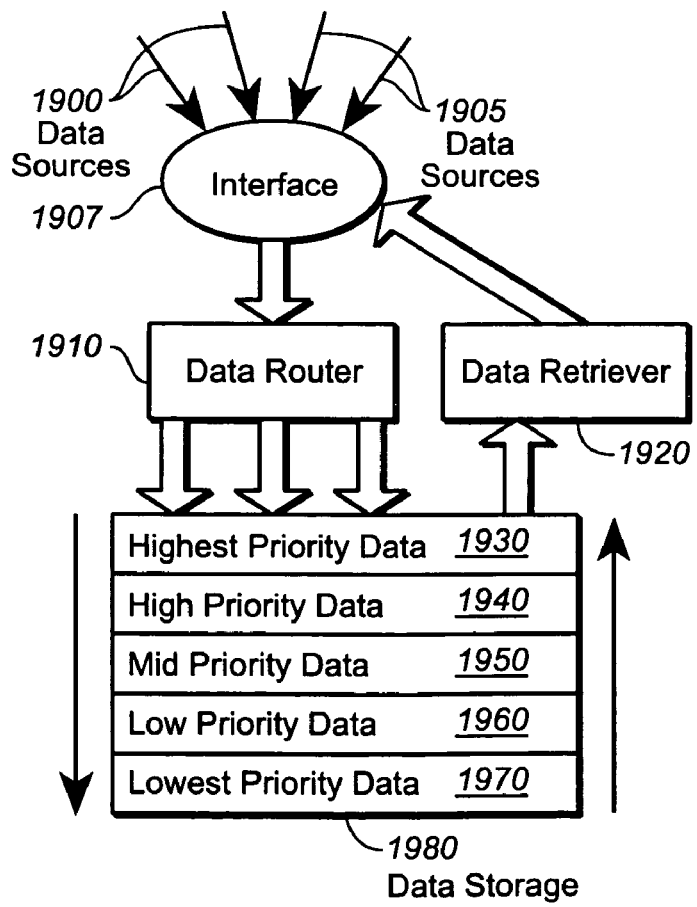
FIG._19

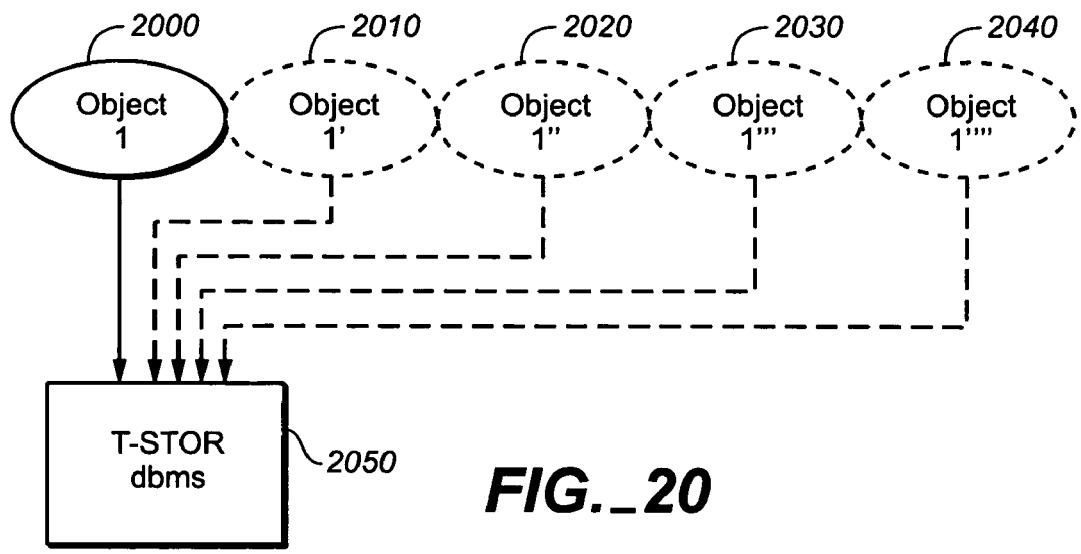
FIG._20
Main Classes of Objects
| Abstract Data | Spatial | Temporal |
|---|---|---|
| Data Sets ⸺ 2100 | 2D ⸺ 2110 | 1D + Time ⸺ 2120 |
| Mathematical Objects ⸺ 2105 | 3D ⸺ 2115 | 2D + Time ⸺ 2125 |
| | | 3D + Time ⸺ 2130 |
| | | Multimedia ⸺ 2135 |
FIG._21

Phase I
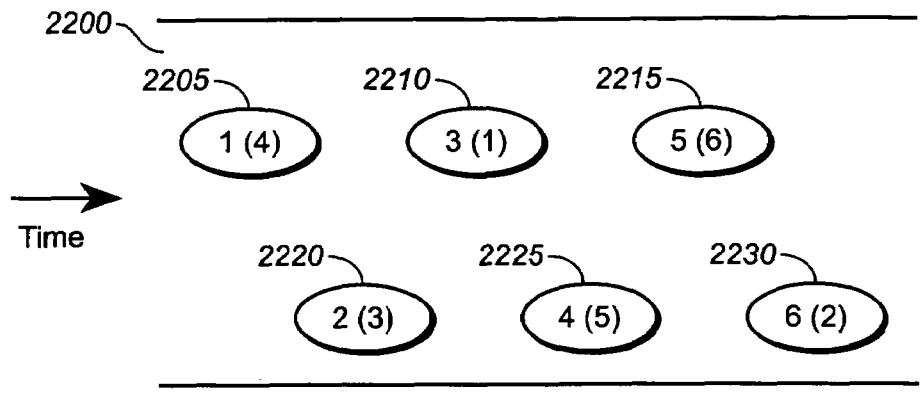
Phase II
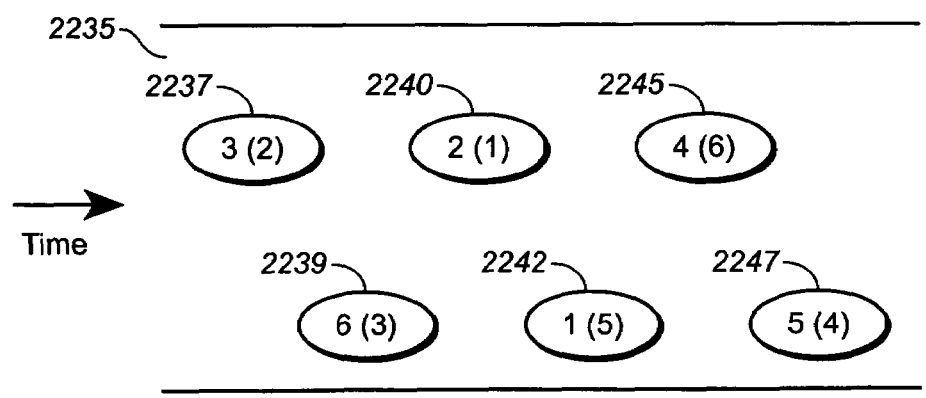
Phase III
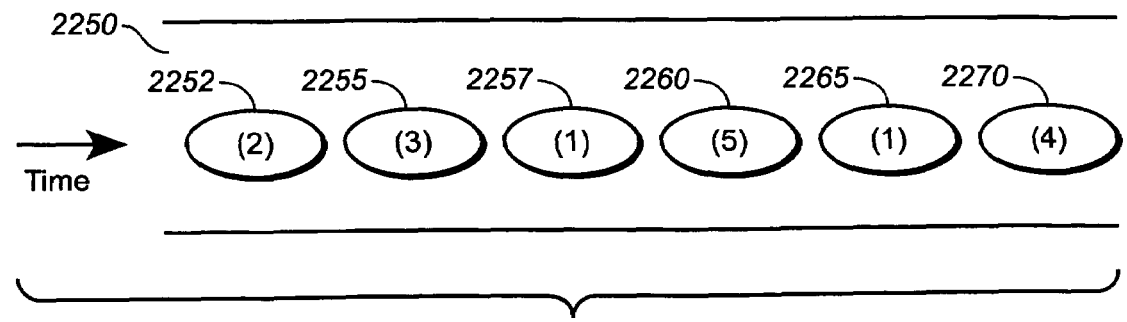
FIG._22

Phase I
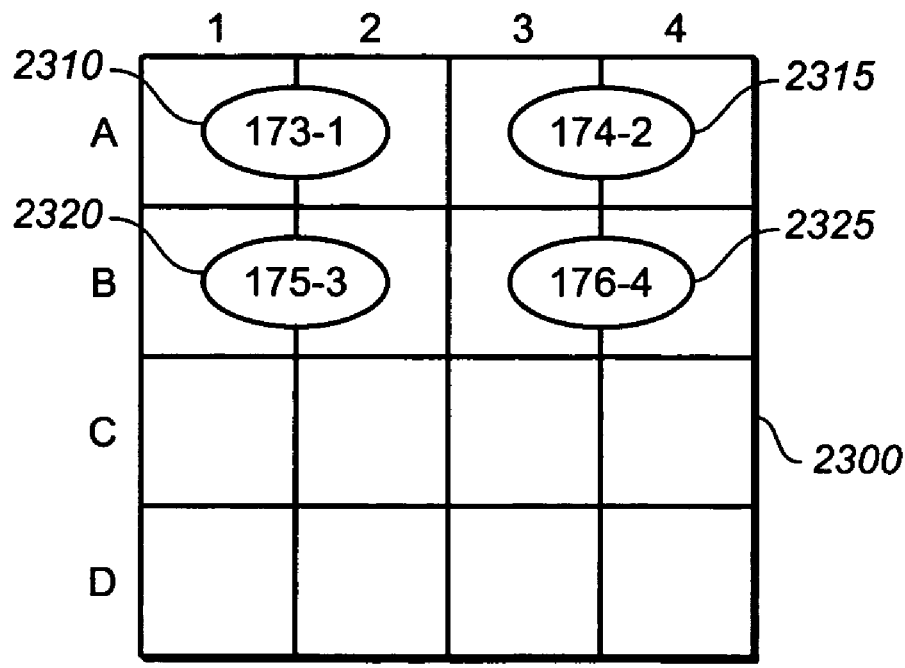
Phase II
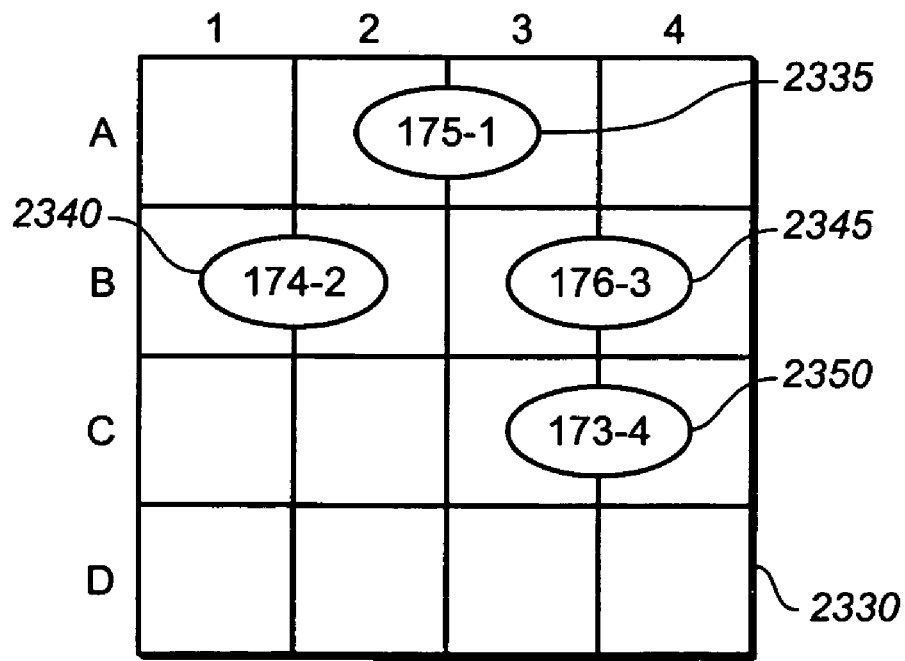
FIG._23

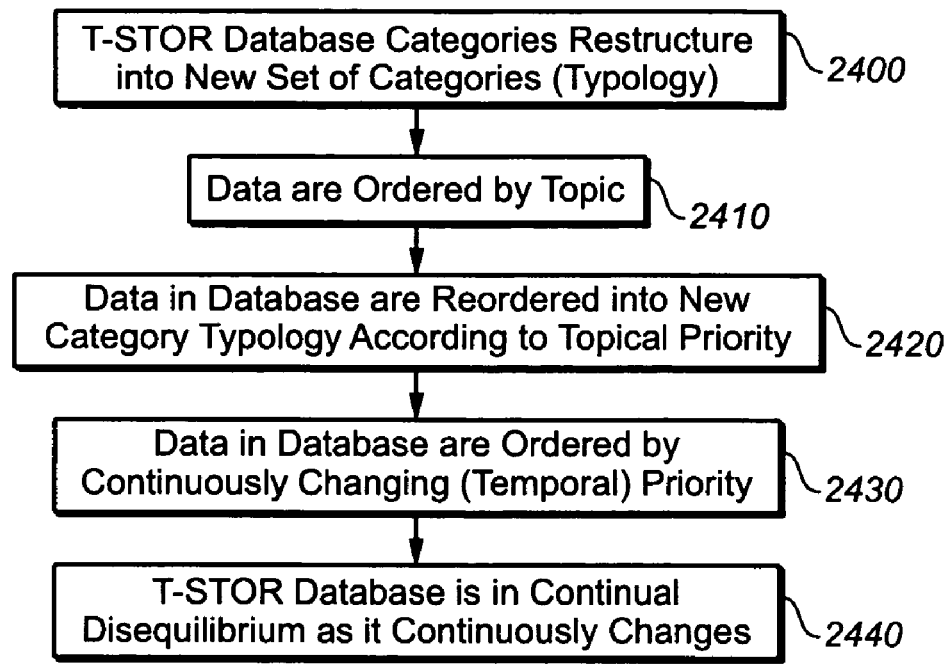
FIG._24
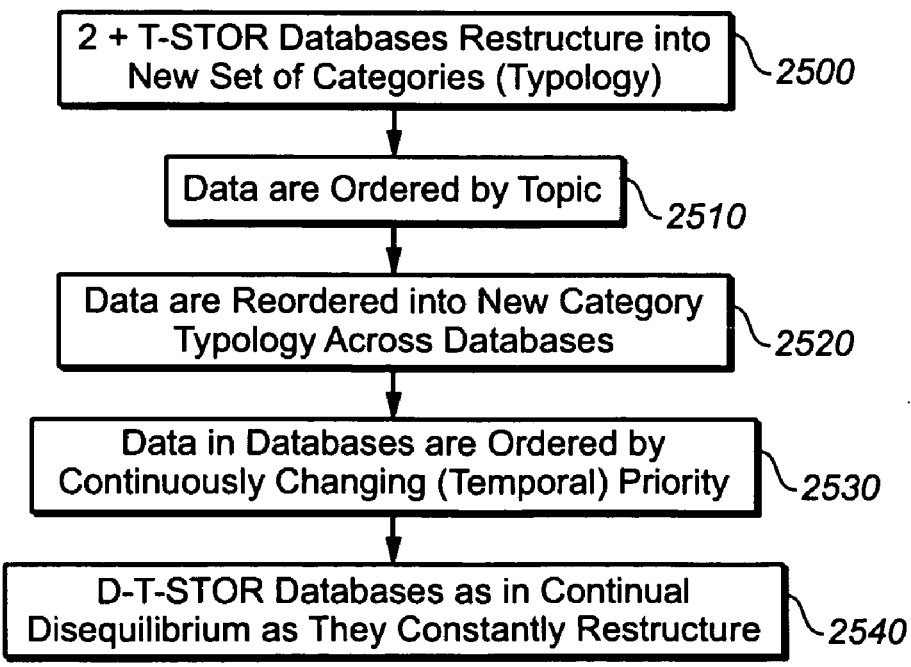
FIG._25

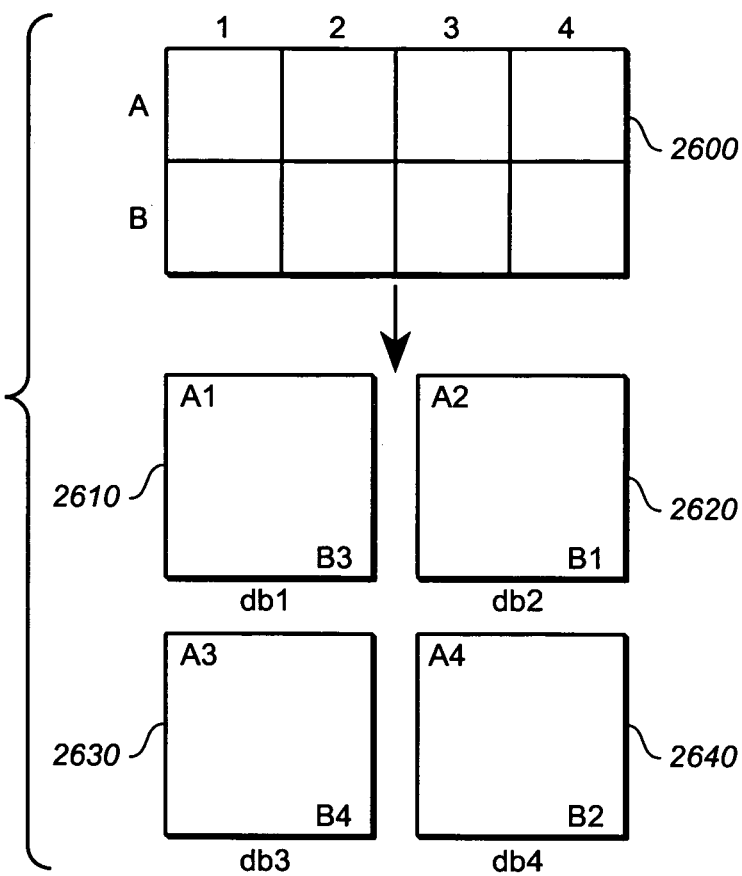
FIG._26
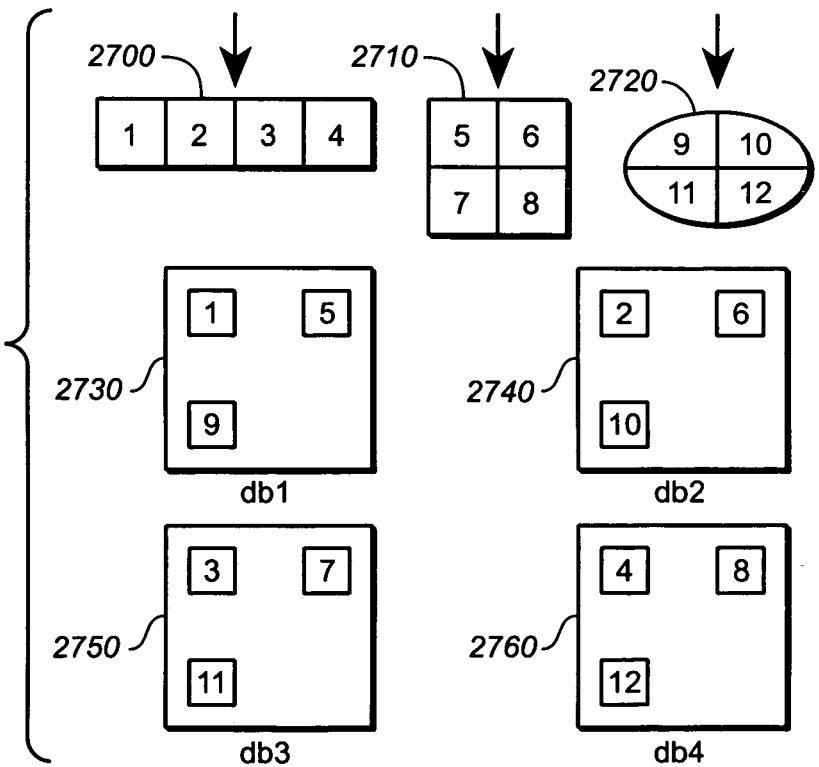
FIG._27

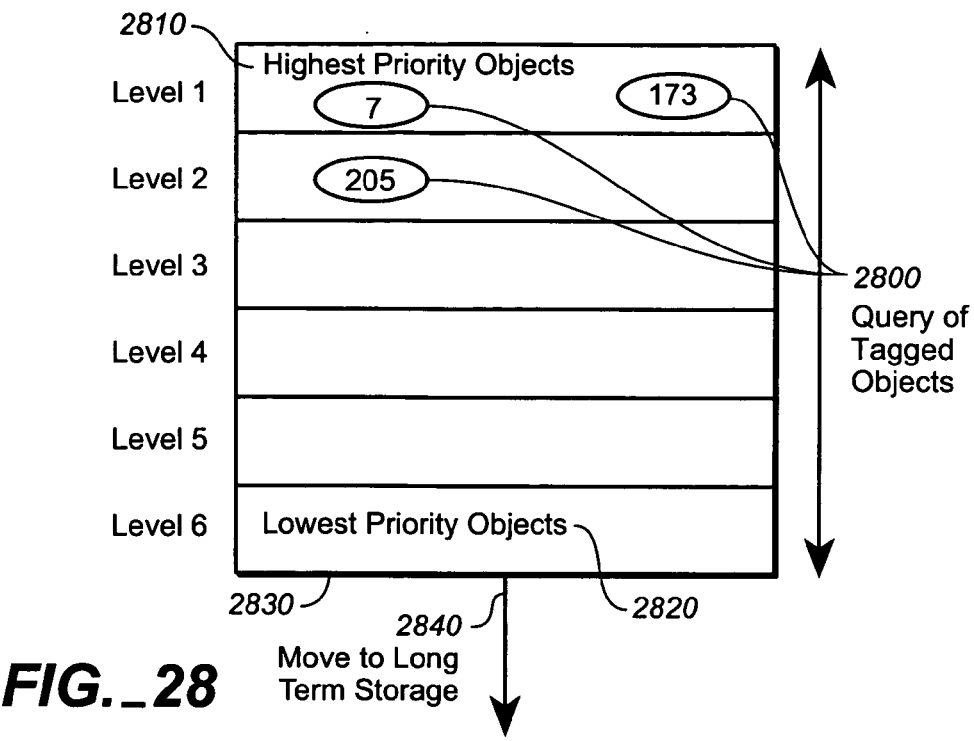
FIG._28
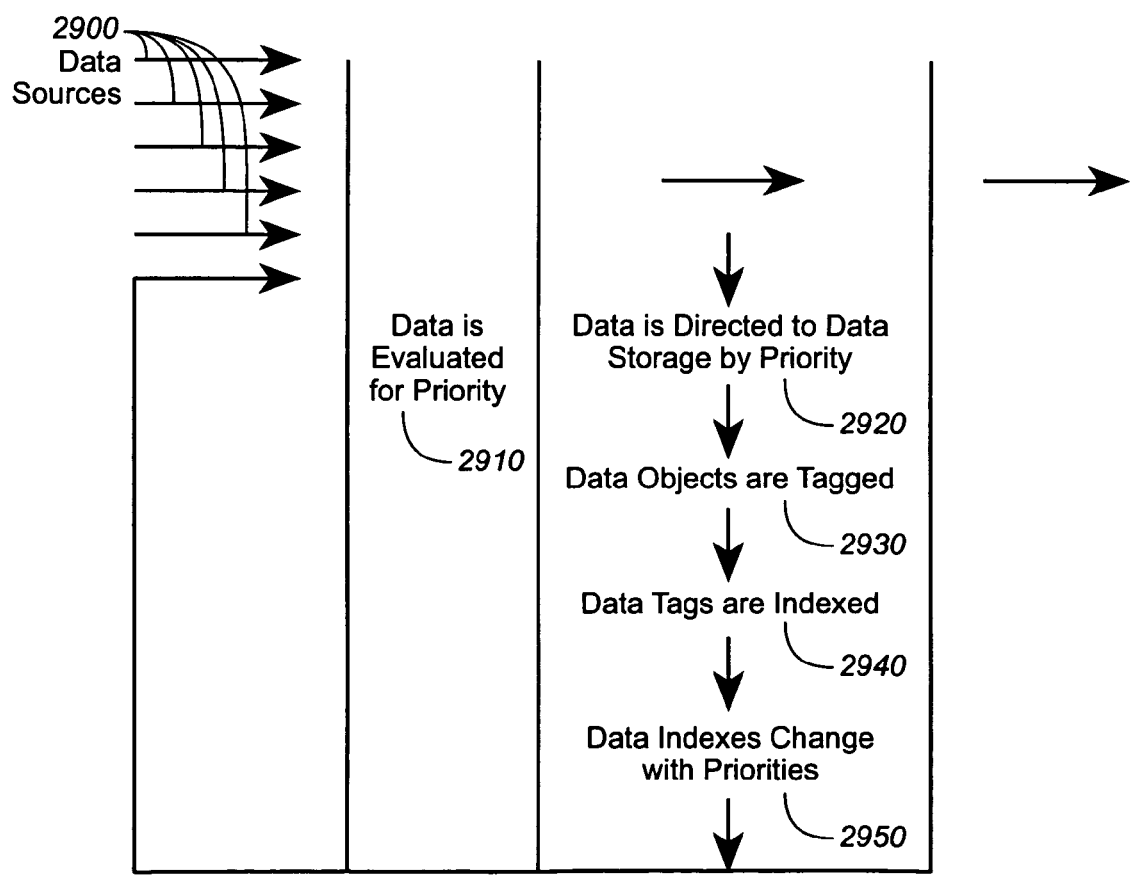
FIG._29

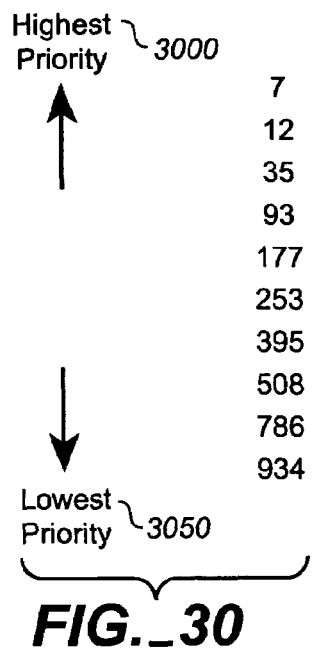
FIG._30
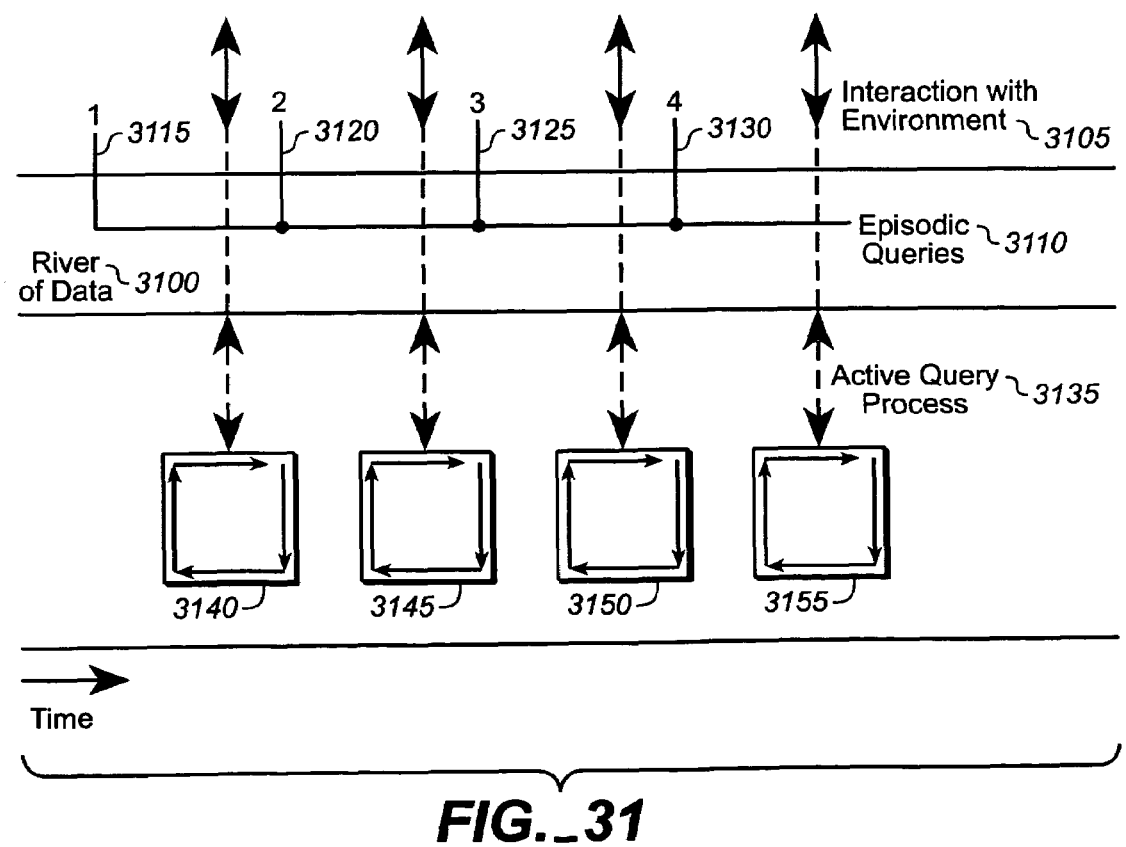
FIG._31

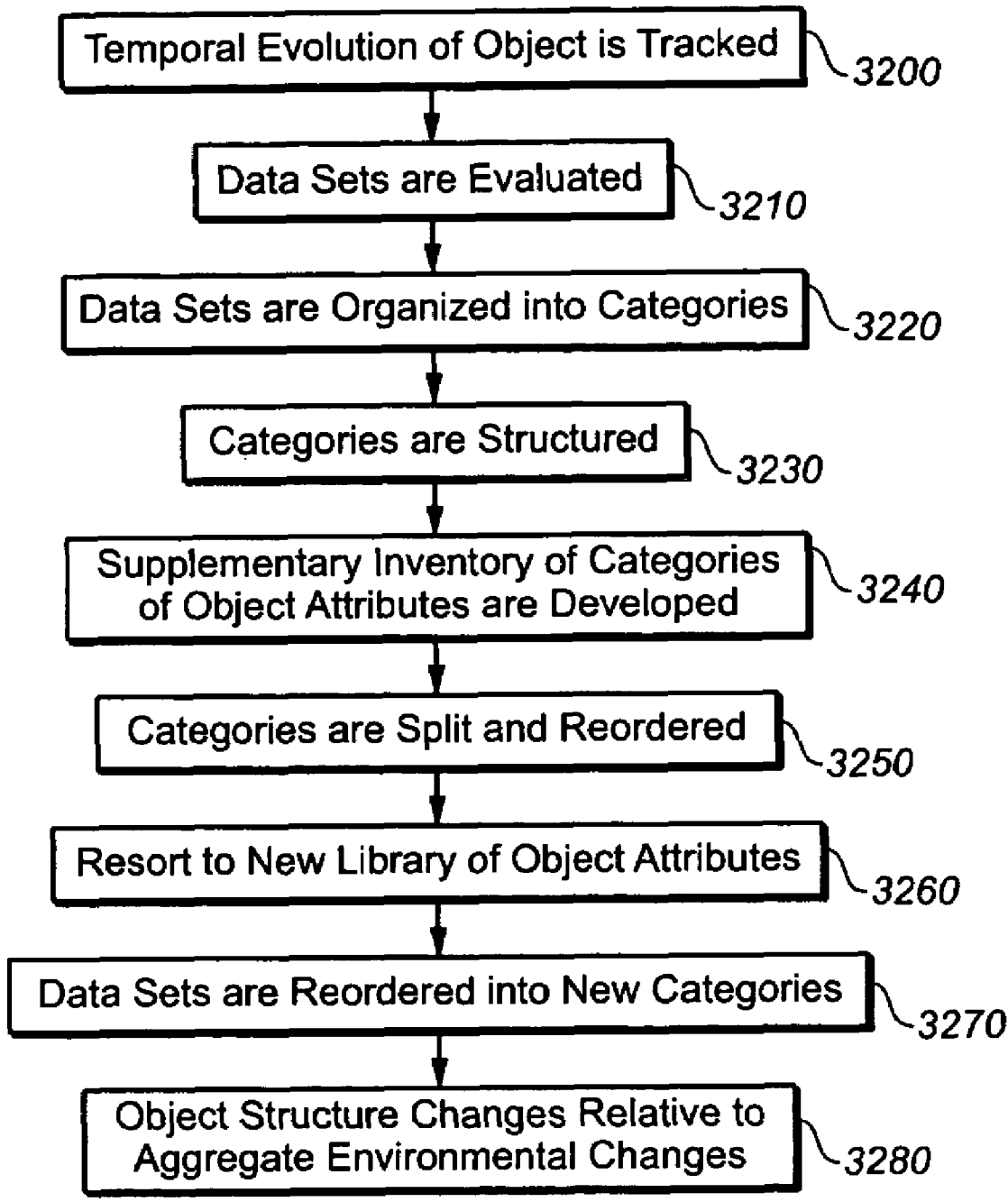
FIG._32

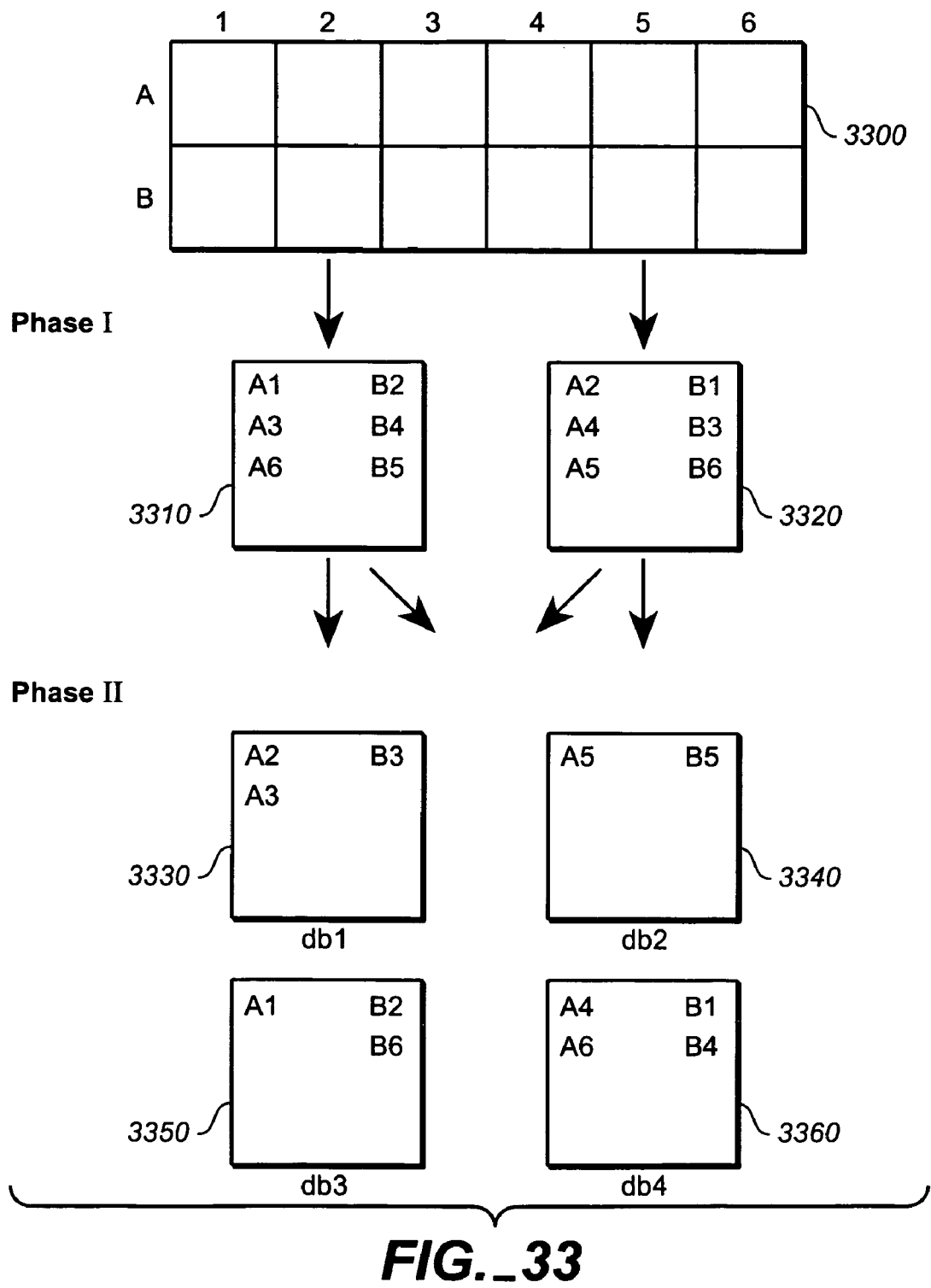
FIG._33

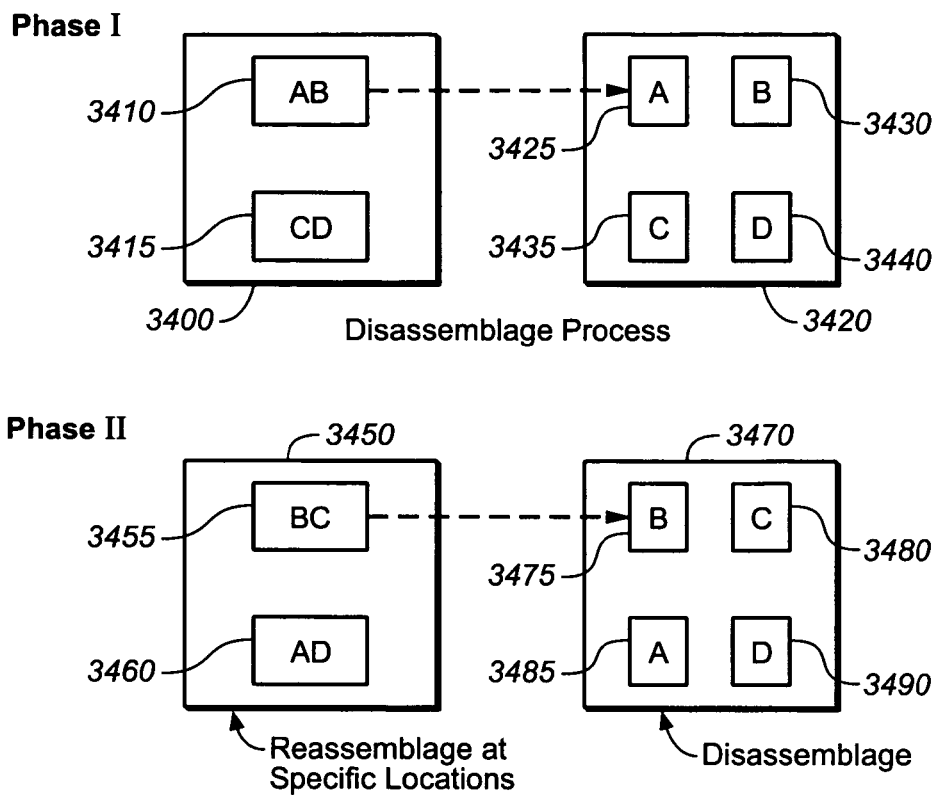
FIG._34
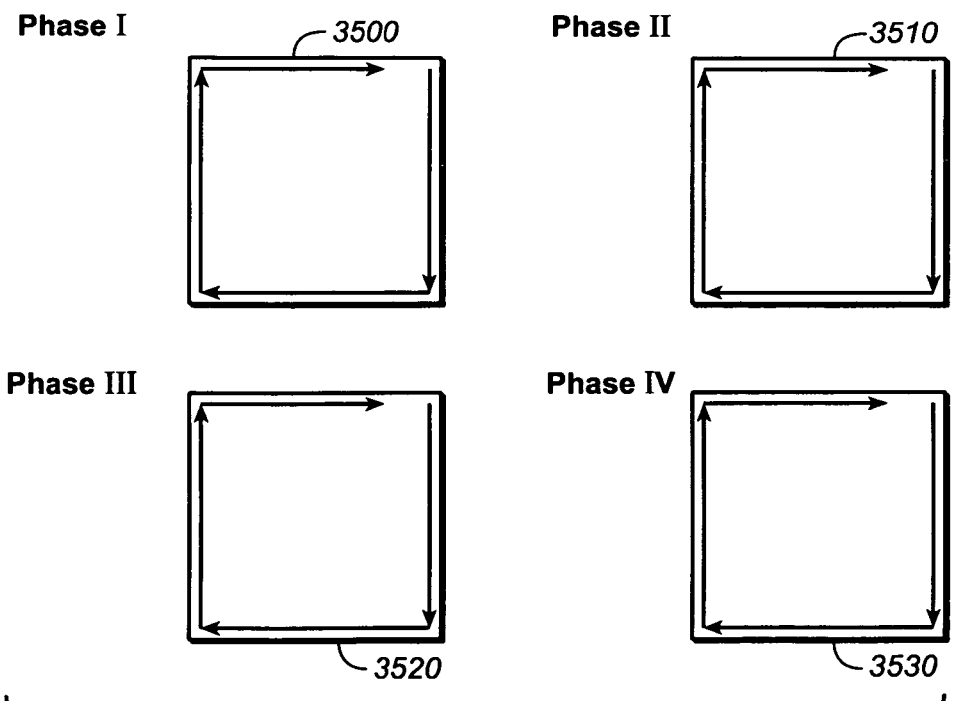
FIG._35

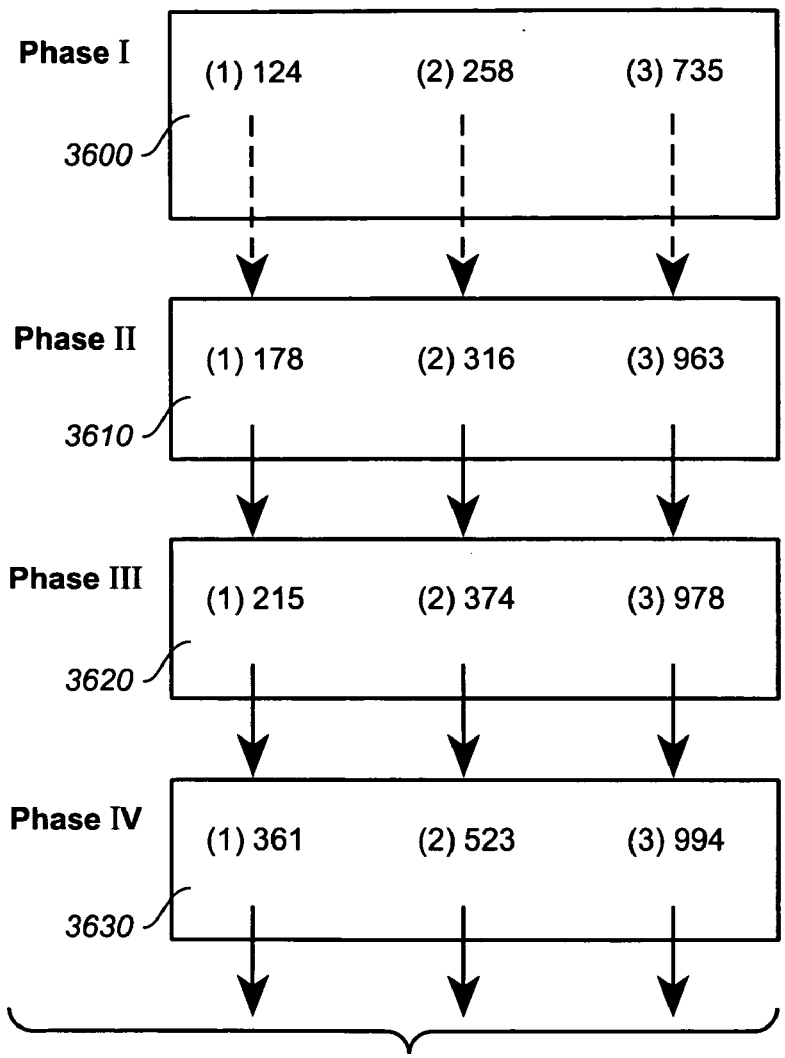
FIG._36
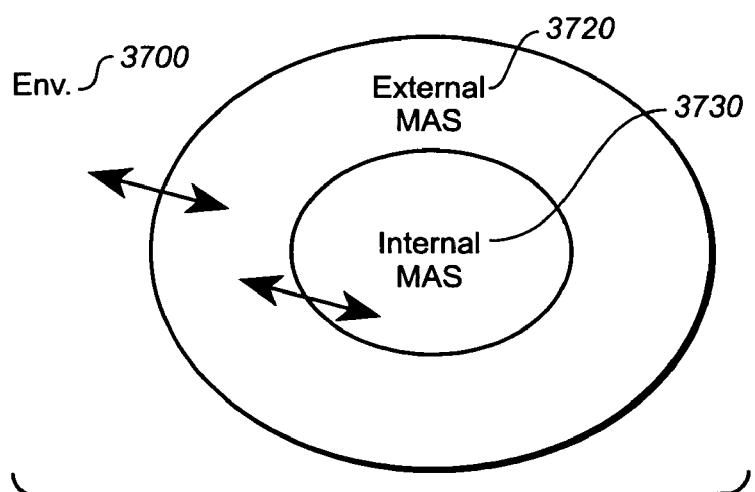
FIG._37

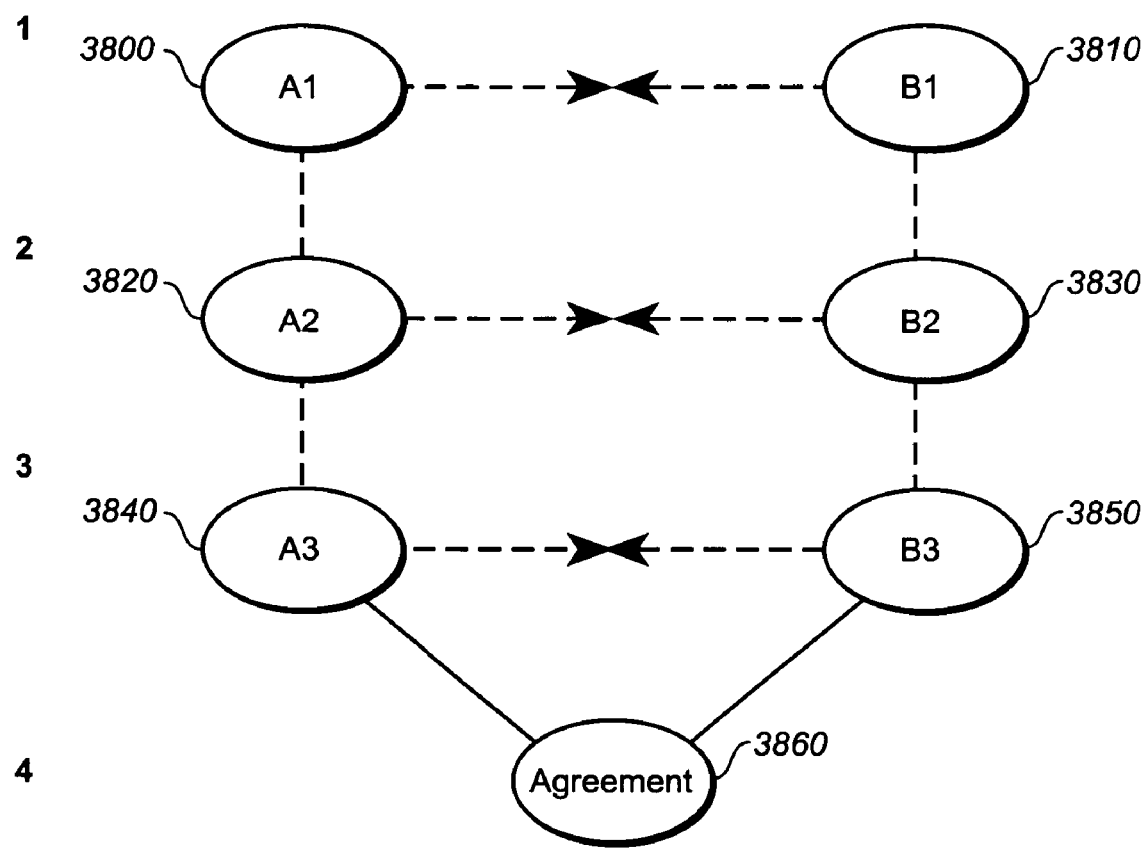
FIG._38

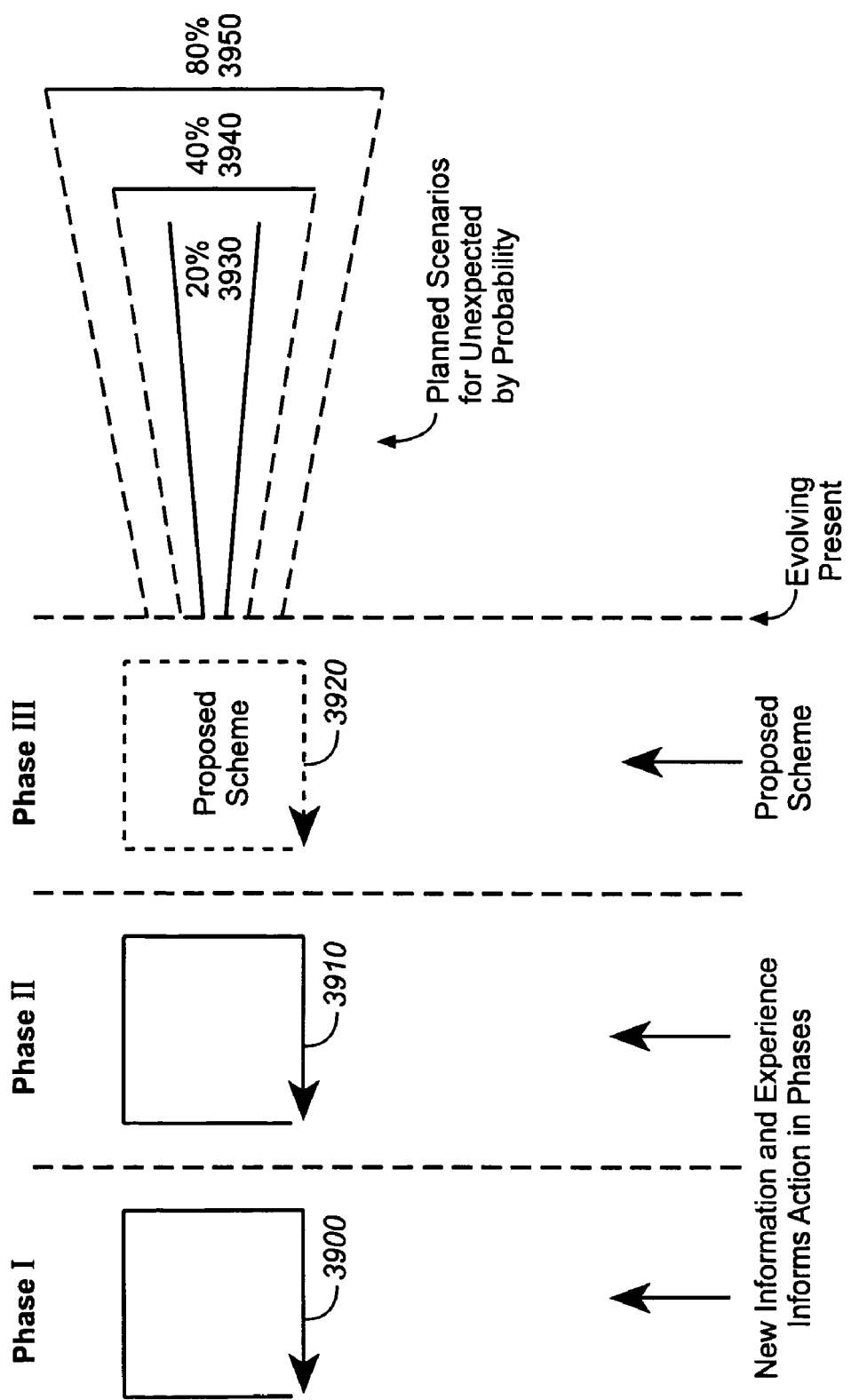
FIG._39

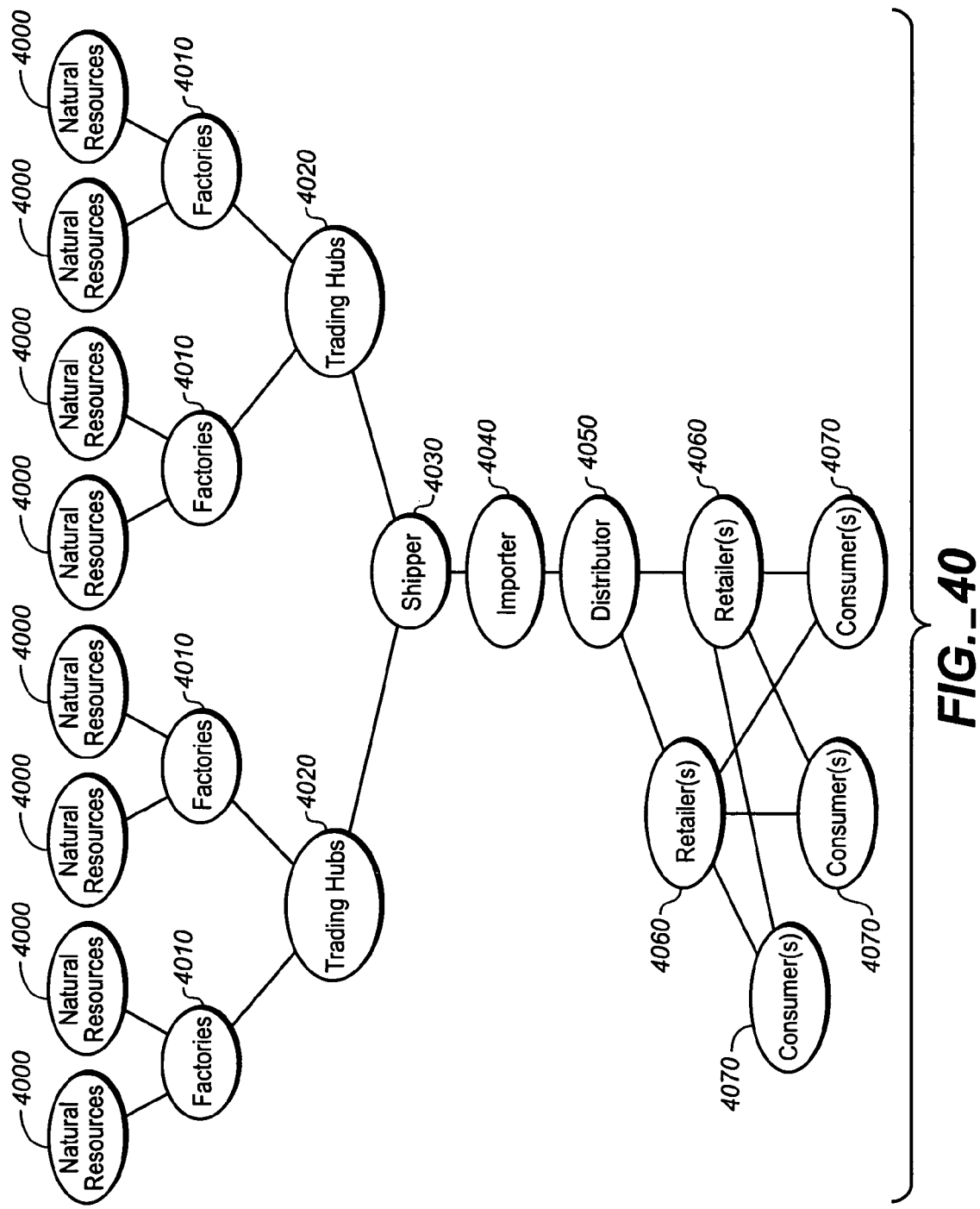
FIG._40

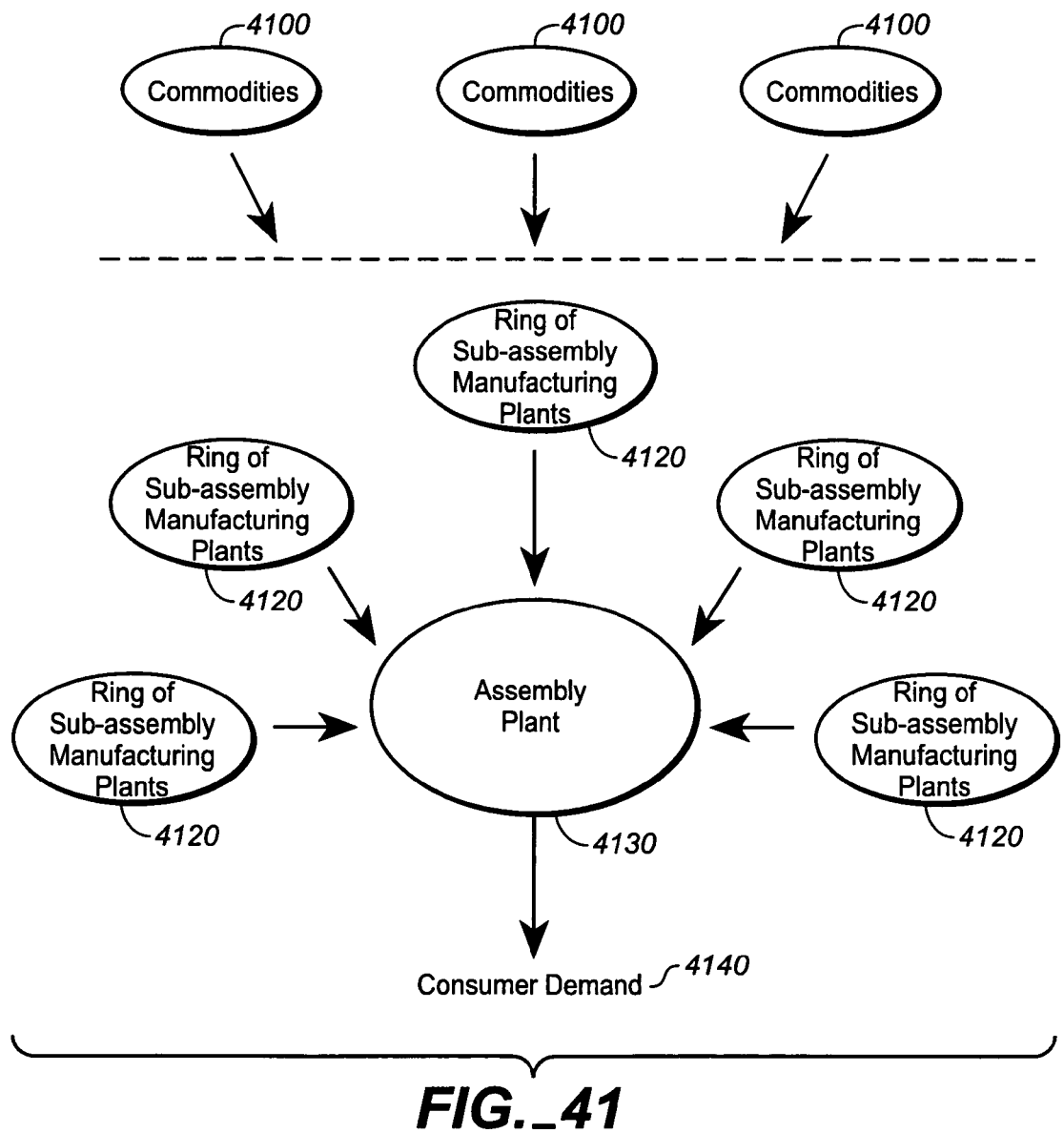
FIG._41

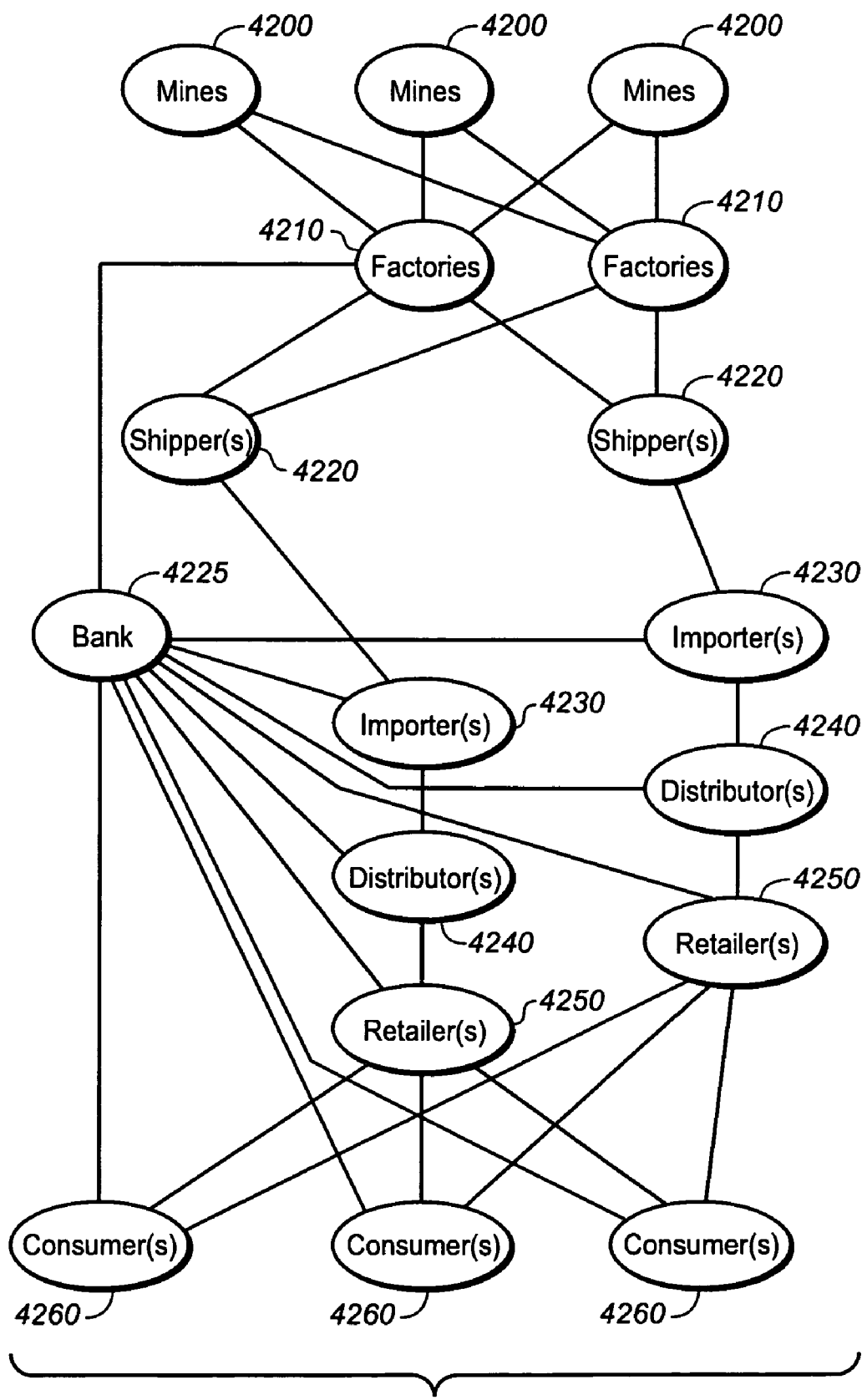
FIG._42

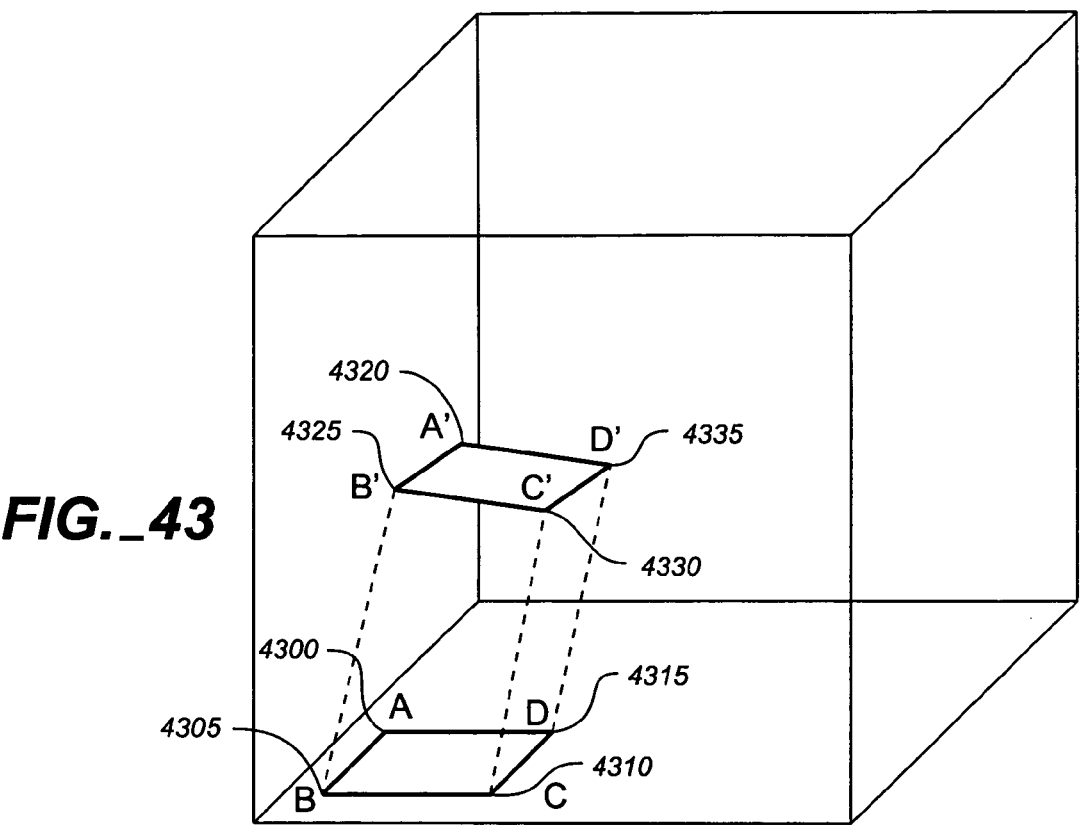
FIG._43
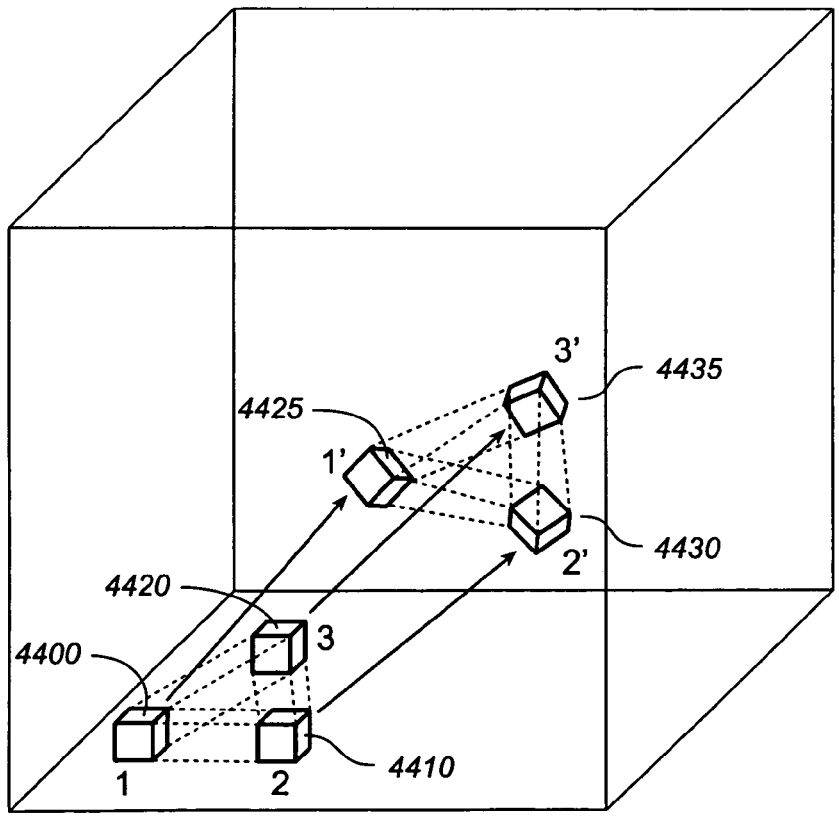
FIG._44

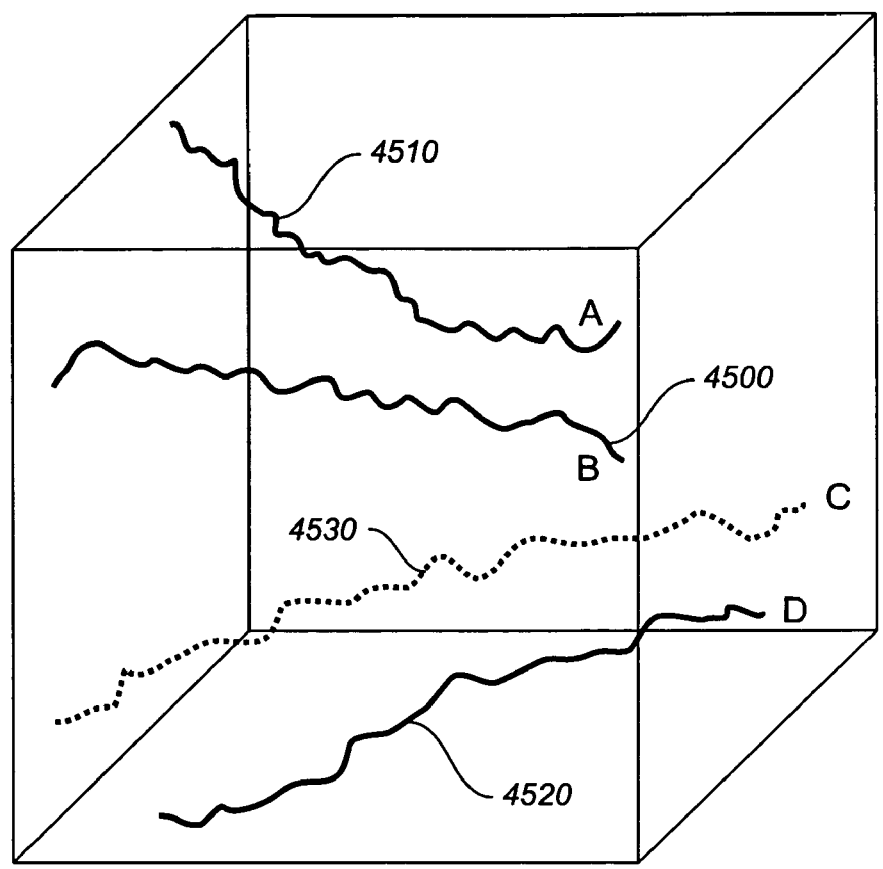
FIG._45

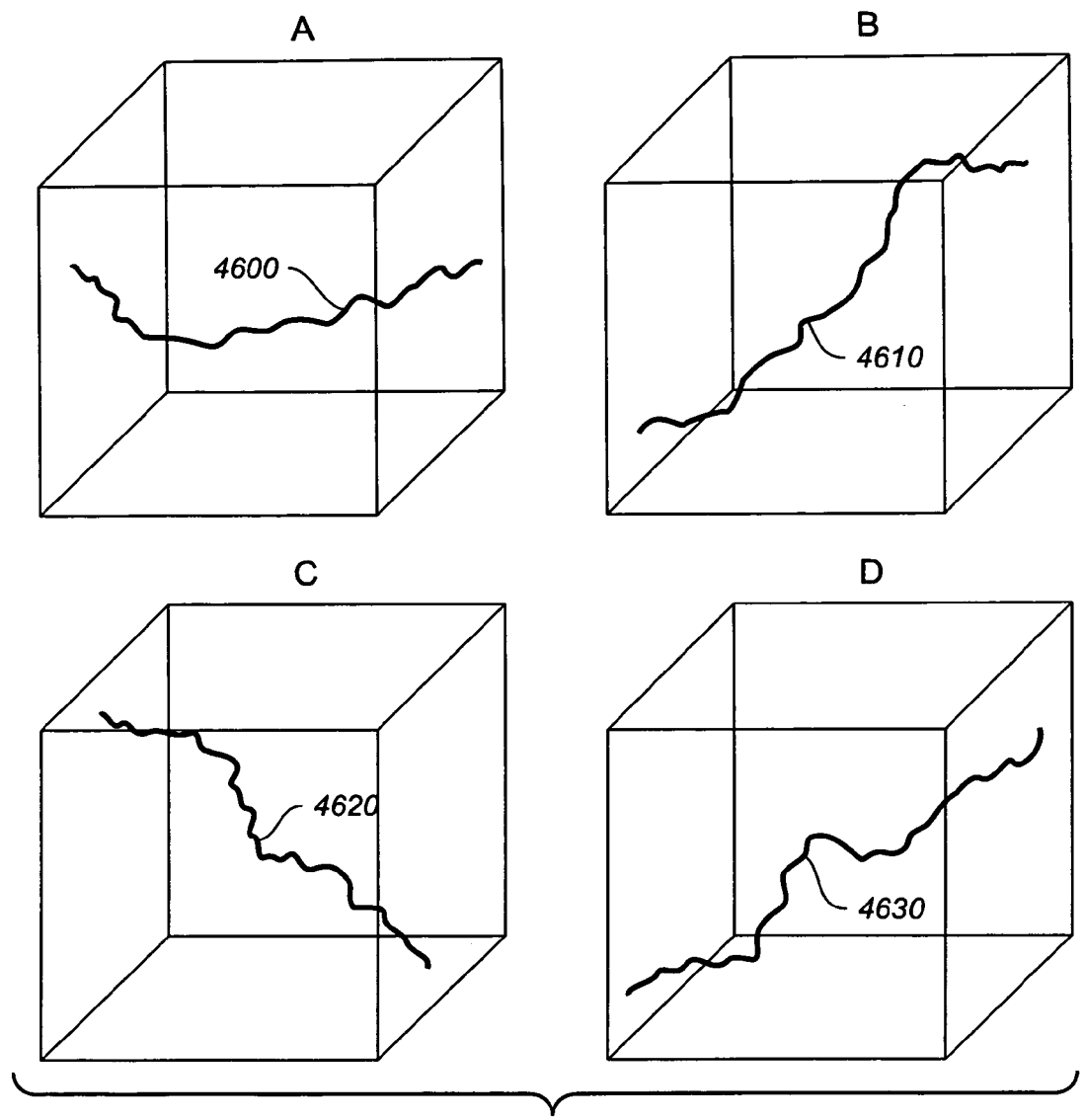
FIG._46

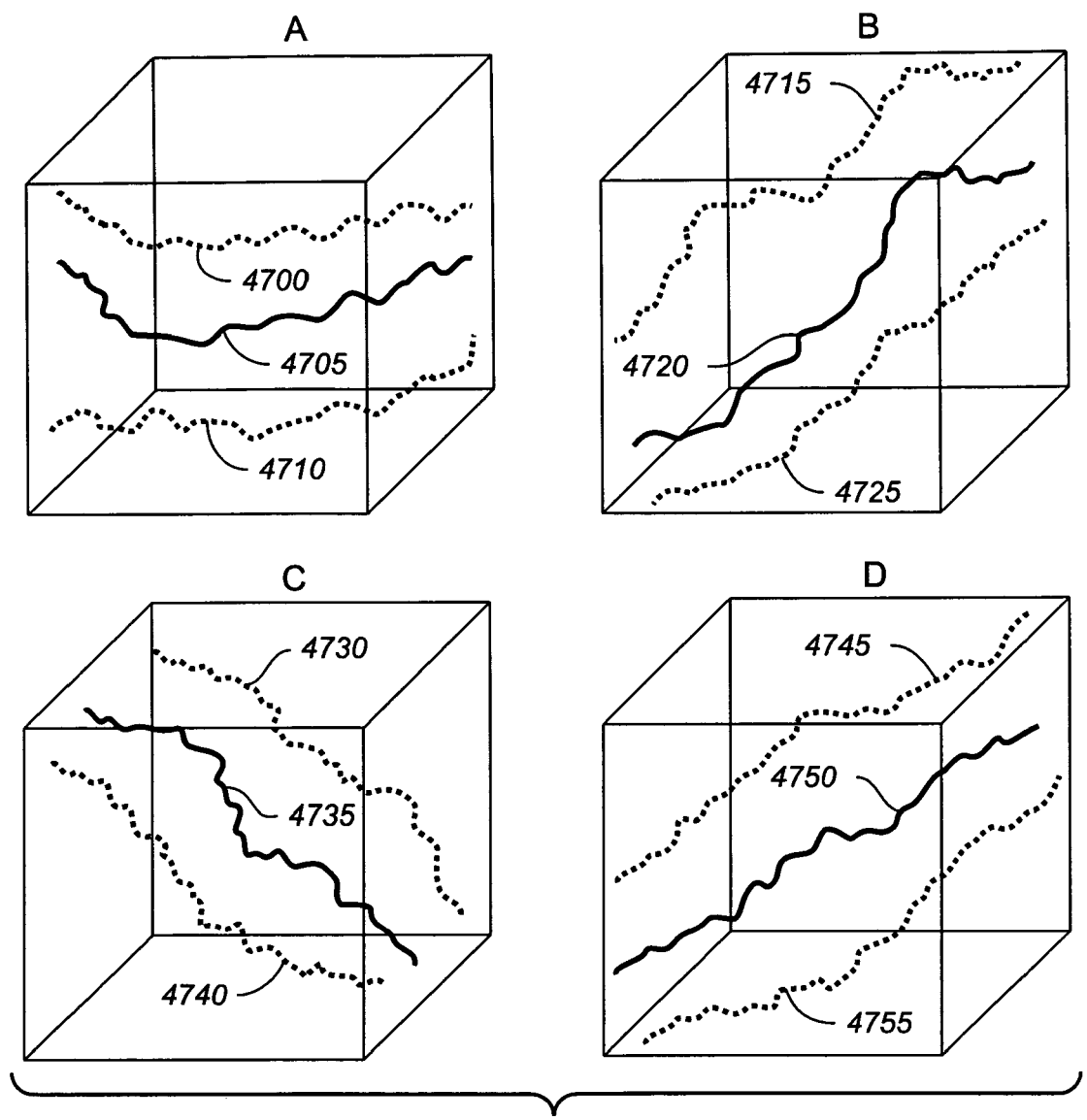
FIG._47

DYNAMIC ADAPTIVE DISTRIBUTED COMPUTER SYSTEM

CROSS-REFERENCES TO RELATED APPLICATIONS

The present application claims the benefit of priority under 35 U.S.C. 119 from U.S. Provisional Patent Application Ser. No. 60/539,095, filed on Jan. 23, 2004, the disclosures of which are hereby incorporated by reference in their entirety for all purposes.

BACKGROUND OF THE INVENTION

Simple databases were developed by IBM Corporation several decades ago. The relational database management system (dbms) was the dominant database model until object databases were developed. Object relational databases and distributed database systems are now the paradigm. Computer systems now use active storage in which the database is the core of the system and microprocessors are simply embedded in the hard drives for database control and management. Advanced systems such as the U.C., Berkeley Telegraph Continuous Query (CQ) model of dynamic database organization represent further developments of this database tradition. The main uses for these types of databases are data storage, data updating, data queries and data outputs. Oracle Corporation has developed database architectures that use temporal data by updating known temporal fields as the conditions of the data sets undergo change. Finally, the CHORO CHRONOS project in European research universities has sought to develop spatio-temporal databases that use and organize spatio-temporal data objects. Spatio-temporal data objects are complex data sets represented in databases that change position across space and time.

All of these dbms's are typically static in nature. Once they are programmed, data is input and output within a preset organizational structure. This model is useful for simple applications. But as multitudinous data sources become ubiquitous, the limits of this static model become obvious.

What is needed is a complex distributed dynamic database model that is adaptable, scalable and capable of evolution and reorganization. As computer systems become linked in the next generation, this model distributed computer architecture will behave like an organic system in nature. In fact, the biological theory of evolution is precisely the model for complex collective self-organizing intelligent computer systems.

Whereas there have been numerous advances on small parts of computer systems, there has been relatively little progress involving the management, control, automation and synthesis of complex aspects of very large scale dynamic systems. The present system fills this important gap.

BRIEF SUMMARY OF THE INVENTION

Embodiments of the present invention provide a system that optimizes the efficiency of a complex database. According to one aspect of the invention, an adaptive dynamic computer system architecture having a plurality of system layers interconnected to one another is provided. A first layer includes a hardware system including microprocessors, application specific integrated circuits or continuously programmable field programmable gate arrays. A second layer includes distributed nodes. A third layer includes a distributed transformational spatio-temporal object relational database management system. A fourth layer includes a multi agent system of intelligent mobile software agents. A fifth layer includes plasticity behavior in intrasystemic interaction. A sixth layer includes plasticity behavior in environmental interaction. A seventh layer includes a plurality of functional applications.

BRIEF DESCRIPTION OF THE DRAWINGS

FIG. 1 is a list of system layers.

FIG. 2 is a schematic diagram of a distributed transformational spatio-temporal object relational (D-T-STOR) dbms and multi-agent system (MAS) architecture.

FIG. 3 is a map of a D-T-STOR dbms and MAS with environmental adaptation.

FIG. 4 is a map of a D-T-STOR dbms and intelligent mobile software agents (IMSAs) operation.

FIG. 5 is a schematic diagram of varied pathway frequency between T-STOR nodes.

FIG. 6 is a flow chart of internal analytical operations that catalyze a systemic transformation.

FIG. 7 is a temporal diagram of an inter-node pathway in a process of minimization.

FIG. 8 is a temporal diagram of network adaptation.

FIG. 9 is a temporal illustration of plasticity operation between nodes with weaker links failing and stronger links gaining in intensity.

FIG. 10 is a temporal diagram of adaptation of the plasticity process that catalyzes T-STOR transformation.

FIG. 11 is an illustration of connection of plasticity and D-T-STOR transformations.

FIG. 12 is an illustration of a hub of D-T-STOR databases connected to a conjoined hub of D-T-STOR databases.

FIG. 13 is a temporal illustration of a continuously programmable field programmable gate array (CP-FPGA) rewiring over phases for rerouting.

FIG. 14 is a flow chart of a distributed CP-FPGA sequential process.

FIG. 15 is a diagram of a D-T-STOR dbms.

FIG. 16 is a multi-phasal diagram illustrating the shifting of temporal priorities.

FIG. 17 is a temporal illustration showing micro-change and macho-change of categories.

FIG. 18 is a flow chart showing category transformation.

FIG. 19 is a diagram describing data repositioning process by temporal priority.

FIG. 20 is an illustration describing evolution of an object in which data about the object is "pushed" to data storage.

FIG. 21 is a table showing the main classes of objects.

FIG. 22 is a multi-phasal illustration showing the reordering process of objects.

FIG. 23 is a multi-phasal diagram showing the repositioning of objects based on changing (temporal) priority.

FIG. 24 is a flow chart showing the T-STOR transformation process.

FIG. 25 is a flow chart showing the D-T-STOR transformation process.

FIG. 26 is a schematic diagram showing the process of splitting an object to order into different storage locations.

FIG. 27 is a schematic diagram showing data tagging method for organization of data flows in distributed T-STOR dbms.

FIG. 28 is an illustration showing the query of objects with object tags that change with priority.

FIG. 29 is an illustration describing the data tagging process as data indices change with priorities.

FIG. 30 is a table showing data temporal priorities.

FIG. 31 is a temporal illustration describing a multi-phasal process of organization of rivers of data in an active query process in a system with environmental interaction.

FIG. 32 is a flow chart illustrating a method of composite valuation of complex data sets in distributed T-STOR dbms.

FIG. 33 is a temporal illustration describing spatial repositioning of data sets in a distributed T-STOR dbms.

FIG. 34 is a temporal diagram showing the disassemblage process and reassemblage process of data objects.

FIG. 35 is an illustration describing the sequential transformation of databases in a distributed dbms.

FIG. 36 is a multi-phasal illustration showing the indices of objects that continually change revealing the varied positions of objects in a dynamic distributed dbms.

FIG. 37 is a diagram showing the relationship between internal and external multi-agent systems.

FIG. 38 is a multi-phasal illustration showing a negotiation process between two software agents.

FIG. 39 is a temporal map illustrating analytical process of IMSA to use experience (from environmental interactions) and new information to plan scenarios according to limited range of probabilities.

FIG. 40 is a diagram describing a system that links factories, trading hubs and supply chain management operations.

FIG. 41 is a diagram describing an enterprise resource planning system.

FIG. 42 is an illustration showing the structure of a global enterprise resource management system (GERMS).

FIG. 43 is a four dimensional illustration of an object over time.

FIG. 44 is a four dimensional illustration of groups of tuples mapped in a T-STOR database over time.

FIG. 45 is a four dimensional illustration of four sets of points over time represented in a T-STOR database, which react to changed movement.

FIG. 46 is a diagram of four 4-D T-STOR databases in a distributed computer system, each showing points over time.

FIG. 47 is a diagram of four 4-D T-STOR databases in a distributed computer system with points over time and their reactions for changed structures.

DETAILED DESCRIPTION OF THE INVENTION

Databases are a core component of computer systems that store, order and retrieve sets of data. They are the central instrument for the storage, search, analysis, organization and output of data sets and objects in computer systems. When they are linked, databases become a key part of decentralized computer networks that can optimally organize data for maximum benefit. Complex large dynamic distributed databases are like a riverbed in the sense that they represent the foundations for data as they are constantly input into the system over time, are analyzed and ordered, and are, finally, output. Dynamic distributed databases, because they input and output data, constantly adapt their structure to changing environmental inputs and the outputs that are required by specific applications. Dynamic distributed databases can be active and seek out data from various sources. Similarly, they can anticipate change, adapt and learn, and generate novel questions to which they provide answers. These complex dynamic distributed database systems also change their own structure as the overall network evolves. In other words, because the data inputs change within a changing environment, the database architecture is designed so that the structure of the system itself adapts in order to maximize performance and interact with the environment.

Dynamic distributed database systems employ a process which consists of several phases. First, the initial system configuration accepts demand-initiated data sets from various sources. Second, the time sensitive data sets are organized efficiently by priority. Third, when thresholds of efficiency are satisfied, a newly-implemented phase restructures the architecture of the initial organization of the data structures according to shifting priorities. This multi-phasal process continues as required, thereby leading to continuous restructuring of the architecture of the system as new data streams are input, triggers enable the transformation process, and data sets are output for various applications. The criteria for these changing states within the system also evolve. Because the system constantly evolves, it must anticipate change within a limited horizon. The system is constantly optimized while the data sets are constantly reorganized for maximum efficiency and benefit.

Distributed T-STOR dbms

The core vehicle for the transformational process in the present invention is the transformational spatio-temporal object relational (T-STOR) database management system (dbms). These dynamic data storage entities consist of complex program code which inputs, stores, analyses, organizes, reorganizes, searches and outputs data sets. The chief mode of change in the dbms involves temporal transformation of the objects. The representations of the transforming objects in the database system take the form of data sets that continually reposition relative to their changing priority.

At a specific threshold point, the sum of data objects in the database system initiates a process of transformation. This process begins with the restructuring of the categories of the system. The database is analogous to a warehouse full of goods that is constantly in a state of change and around which a large amount of unused goods, that have accumulated over the years, is scattered. At some point, it becomes necessary to reorganize the goods in the warehouse. However, the managers take the opportunity to create new efficiencies and begin the organization process from the beginning by constructing new categories into which the goods may be organized, because over the years the nature of the goods has changed. Another analogy would involve the need to reorganize a file storage system because new categories of business have affected the architecture of the categories of the accumulated files. Hence, the files need to be reordered, as do some of the file contents themselves. The contents need to be updated based on most recent data. Unlike the case of a file cabinet system, in the complex world of databases, these updating systems occur very rapidly; the time sequences of data restructuring are very short, and the data streams are vast.

T-STOR databases undergo transformational processes as they adapt their structures to novel data sets which are constantly reprioritized. Distributed T-STOR databases represent further implementations of the system in which data objects are sorted over a broader distribution scope. D-T-STOR databases create a complex computer network system in which database structures constantly transform in order to accommodate rapidly changing data objects in the environment. The creation of a D-T-STOR dbms has implications for the development of a dynamic distributed computer system that has numerous novel and useful applications.

By developing interaction between various T-STOR databases, and by allowing interaction between the database system and the environment, the system allows for plasticity of system configurations and adaptation to a changing environment. On the system level, the process of transformation allows for rewiring between database nodes and accommodation to increasing and decreasing environmental activity. The continuously changing transformational process of the D-T-STOR dbms allows for environmental adaptation in real time.

In an additional embodiment of the system that facilitates dynamic distributed computer adaptation, the system uses groups of continuously programmable field programmable gate arrays (CP-FPGAs). Continually adapting the programming of the hardwired structure of the circuits, multiple CP-FPGAs perform complex routing optimization tasks by synchronizing the sequence of reorganization of circuits across a distributed network in order to accommodate a higher priority function. CP-FPGAs operate as advanced reprogrammable application-specific integrated circuits (ASICs) which have the advantage of high performance yet are constrained to a limited task. Reconfiguring the architecture of the CP-FPGAs in real time, allows them to constantly adapt to the changing environment by instituting high performance functionality without being constrained to a limited task.

In another embodiment, the hybrid combination of distributed CP-FPGAs with the D-T-STOR dbms creates a complex dynamic computer system architecture which may more fully adapt to environmental changes in real time. By combining the combinations of the rapid restructuring of the CP-FPGA hardware with the transformation processes of the D-T-STOR dbms which continually optimize temporal priorities, the invention is able to perform self-organizing processes which allow for real time interaction with the environment.

Intelligent Mobile Software Agents

The main methods of inputting, ordering, searching, fetching and outputting data sets in a dynamic distributed database system are utilized by intelligent mobile software agents (IMSAs). IMSAs are sophisticated software programs that can adapt, learn, generate or terminate code, move from machine to machine, and perform various functions. IMSAs include search agents, analytical agents for data mining and pattern recognition, negotiation agents, collaboration agents and decision making agents. IMSAs may use game theoretical modeling, simulations, and scenarios in order to perform a function or activate an application. The combination of multiple IMSAs in a dynamic distributed database system signifies a multi-agent system (MAS). Teams of agents have specialized (and multi-specialized) functions in the MAS of a dynamic distributed database system. The present system is characterized by a range of main operations and processes of the dynamic distributed database system MAS.

IMSAs are capable of learning and prediction. IMSAs generate probabilistic scenarios by employing fuzzy logic and artificial intelligence techniques. IMSAs anticipate change in order to optimize system performance; thus potential future data sets are anticipated by analysis of past data sets. Many of these complex data processes are time sensitive. For instance, recent storage may be organized for easier early retrieval, while older data sets are reordered with less priority. Analysis of environmental changes in recent data sets generates model scenarios that involve anticipatory processes based on learning from and projecting trends.

Prediction, Problem-Solving and Scenarios

One of the main challenges in developing automated dynamic self-organizing systems is the need to design adaptive and effective processes that anticipate behaviors. The ability to anticipate behaviors or patterns in a system, depends upon the development of predictive capabilities. Although predictions have constraints, the artificial computer systems field can overcome these constraints by borrowing from the field of econometrics and adopting designs based on Bayesian reasoning and other methods to predict and anticipate various scenarios within temporal limits. The present system contains methods for dealing with the most recent data flows and data analysis to inform scenario generation and selection, based on the use of predictions and expectations derived from the analysis of trends.

In some ways, the challenge for a complex dynamic system is one of discerning how to solve problems. For every set of problems, a set of solutions is proposed and tested in real time. Prior patterns of problem solving are presented in order to assess the optimal solution to a new set of facts. Solution option scenarios are anticipated by past problem solving sequences. Anomalies are detected as limits in past solutions, multivariate analyses are performed on the problem, and a new set of solution options is generated and evaluated by combining possible solutions. Problem solving is performed on the fly in real time with limited information. After a pattern of problems is recognized and solution options are offered, the system will anticipate changes in the environment and generate simulated scenarios for optimal solutions to future problems. The analysis of trends and the generation and evaluation of scenarios suggest that the system is capable of learning and adaptating to the uncertainty of ever changing environments. These sorts of models have been applied to securities markets but have application to a much broader range of categories.

Induction and Learning

The application of prediction analysis and scenario generation and selection processes relies on principles of induction and learning. Consequently, the present system incorporates these processes. Artificial intelligence methods and techniques, including evolutionary computation and artificial neural networking are possible because generations of programs have been trained to learn. Inductive inference represents a way to learn from instances in the past, while deductive inference stems from an axiomatic set of rules (and meta-rules) within a finite systemic range of actions. For the most part, inductive inference is the dominant model learning in complex adaptive dynamic self-organizing systems.

The ability of an adaptive system to learn depends on a number of factors, including the environmental inputs, the analysis of patterns and trends, the development of experimental protocols, the assessment and matching of potential solutions to real problems, the continual readjustment process through periods of turbulence, the anticipation of problems and anomalies, and the generation, evaluation and selection of simulated scenarios and solutions.

System Architectural Self-Organization and Automatic Programming: Implementing AI Because these systems are complex and dynamic, there is no equilibrium within them. Rather than simply passively analyzing and assessing data sets, the present system is active. It initiates actions and changes the structure of the system itself in order to accommodate these changes. In this sense, the present system is characterized by plasticity within a dynamic architecture in much the same way that the human brain constantly rewires itself based on various threshold inputs and activities. While the system constantly adapts itself to its changing environment and rewires itself, it is also a distributed network. Consequently, data streams flow between all active nodes in the system. Activity hubs emerge and decline. These data flows inform, and are consequently rerouted by, the restructuration of the system.

In such a system, the network's computers themselves behave like switches in a giant distributed system. The benefit of this system's dynamic reconfigurable unified artificial adaptive network is that as demand changes rapidly, virtual intelligent hubs are created as needed. In this sense, the system self-organizes and suggests a sort of unified field theory of dynamic distributed computation systems.

This system relies on a new generation of automatic programming. The distributed computer network contains software agents that control and organize the broader network, with IMSAs that are capable of identifying and assessing problems and generating, evaluating and selecting solutions, all by generating program code autonomously.

Analogies to this complex metasystem may be found in both economic and biological behaviors. In economics, the structure of markets constantly evolves, driven by the behavior of self-interested agents. Inter-agent rivalry forces new market configurations. These intra-system processes reshape the architecture of the markets themselves, which then affects the competitive organization and so on.

In the context of biological systems, two main analogies are pertinent to the present system. First, evolutionary behavior resembles the competitive configuration of economic behavior. Groups of individuals compete for limited resources as whole species rise and fall according to environmental circumstances. These complex processes have led to such diverse phenomena as collective behavior in groups of animals (herding, schooling, flocking and swarming) and the organization of antibodies in the bloodstream to fight off viruses.

The second analogy between biology and complex self-organizing systems involves genetics. Refined over millions of years, genetic material is known to be an amazingly complex self-organizing system. Specific genes are activated at specific times to perform other functions, for instance, to generate a protein which in turn will activate other genes to perform a function within a limited time. This complex dance of genetic material, and its mutations over time, allows us to survive in and adapt to hostile, uncertain and changing environments.

The present system is designed to be an artificial distributed, adaptive, self-organizing, auto-programming computer system that, like genetic material, performs various complex functions. In fact, it is a system within a system because is employs a MAS within the distributed computer network. Such a system is not only multi-tasking, but adaptive, as inputs are evaluated and solutions generated to solve constant problems presented by a demanding and changing environment. Finally, the system constantly reconfigures its architecture in order to optimize its solutions. The system uses AI techniques and methods, including evolutionary computation, artificial neural networks, Bayesian reasoning and fuzzy logic, in order to meet various challenges, from analysis of problems to the generation and selection of simulated scenario options.

Linkages

One of the key aspects of the system is that it links subsystems. In this sense, the system is a "metasystem" that controls various networks. The scope of this metasystem is broad. It is able to link computer networks from the following categories: commerce (commercial hubs, demand-based negotiation and transactions and supply chain management), financial networks, traffic routing, information organization management, demand-based learning, data mining and analysis, (mobile) sensor networks, simulation modeling, collective robotics, wireless mobile communications, automated decision making and adaptive computer systems.

These complex systems share two main attributes. First, they are all adaptive dynamic systems that use self-organization of data inputs that depend on changing and unpredictable environments. Second, these networks can be linked into one system for creation of a single organic metasystem.

The limits of static computer networks make it necessary to posit a more realistic system that emulates the dynamism and unpredictability of complex systems. These advanced systems require novel learning mechanisms that adapt and optimize their evolutionary development paths. The present system model satisfies the requirements of an evolutionary dynamic self-organizing and adaptive network.

The present system describes connections between software and hardware on the one hand, and middleware and its specific applications on the other.

Applications

Dynamic traffic routing optimization is made more efficient with the present invention because it uses CP-FPGAs and the D-T-STOR dbms to greater effect than earlier systems. Communications resources are more optimally routed with the present invention. Computation resource management is also optimized as the system's procedures implement plasticity operations that maximize resources; increasingly active nodes are empowered with greater capacity while less active nodes are disempowered so as to shift resources. The transformational capabilities of the present system allow for the constant prioritization not only of data objects to their optimal routing, but also of whole hubs of varied activity. Taken together, the various routing optimization systems will allow a ubiquitous computing platform which continuously adapts to its users and its environment. With increasingly efficient and useful dynamic sensor networks, this system is the type upon which our security will depend in an increasingly threatening world.

The present invention allows for real time simulation analysis and dynamic scenario analysis because it accommodates real time data inputs, prioritization of data, organization and reorganization of data sets, learning and anticipation. Applications of the present invention to commercial processes, range from the organization of a city to organization of commercial and trading hubs, supply chain management and enterprise resource management. From a demand-based commercial system of retail or wholesale acquisition on the Internet to the creation and self-organization of adaptive commodity trading hubs, the present invention is useful. The system is of particular use in the development of an optimized dynamic supply chain management system which will adapt to the rapidly changing environment. The system is also useful applied to dynamic proximity marketing system which allows consumers to be solicited while walking through a mall during different seasons such that spending their priorities and preferences adjust to changing fads of taste.

The present system is also useful for dynamic enterprise resource planning and management systems. On a worldwide scale, the invention is useful for the global enterprise resource management system (GERMS) in allowing large corporations to manage and link large adaptive systems that interact with a changing environment.

The present invention is very useful in dynamic distributed collective robotics networks that must interact with rapidly changing environments. When the present system is integrated into collective robotic systems, the adaptation process will make possible group automated behaviors hitherto limited to biological organisms.

Finally, the present invention allows the linking of various computer systems in a metasystem.

Problems that the System Solves

The system provides solutions to a number of problematical questions. How does one link a range of complex functions in a distributed network? How does one integrate a MAS into a complex distributed computer network? How can learning processes be structured for the constant adaptation needed by the system? How can the various parts of the system be optimized to work together seamlessly? How can disparate functions be linked, from commercial and financial systems to information and learning systems and from collective robotics systems to wireless and traffic network systems? How can analytical functions be integrated with active functions in a complex distributed computer network?

The system solves a range of important problems involving computer system management. Regarding distributed storage capabilities, if one node is unusable, the current system allows the whole system to be useful because it constantly reorganizes. The D-T-STOR dbms allows a failsafe mechanism for restructuration around limited or decaying nodes. In wireless or in military failsafe communications systems, this model is particularly useful.

In another sense, this invention allows the distributed computer system to continually optimize connections between active nodes, which is useful in adaptive routing architectures involving communications and computation resource systems.

The present invention also allows resources to be allocated to the most efficient uses, by accommodating shifting priorities in real time. Finally, the present invention is designed as a novel self-organizing system that adapts to environmental interactions in real time. By using anticipatory behaviors, learning, and automated programming features, the interaction processes are maximized for mission critical applications.

Advantages of the System

The present invention has numerous advantages over earlier models. The system represents a way to link multiple networks for maximum efficiency. The system optimizes the adaptive self-organizing operations of dynamic networks. The system is applicable to a broad range of applications, from mobile computing network optimization to mobile collective robotics and from dynamic commercial systems to remote sensing networks.

Transformability of the T-STOR database architecture allows the computer system to adapt to new environmental conditions. Re-transformations of the T-STOR dbms allow for continuous adaptations to rapidly changing environments.

The use of spatio-temporal objects in the T-STOR database structure allows for the organization of object categories that most accurately reflect reality.

The use of distributed T-STOR databases allows a range of useful applications. The D-T-STOR dbms allows for the organization, reorganization and automated self-organization of complex processes across space and time. The use of D-T-STOR databases in the plasticity of operations is a novel advantage of the present invention. The constant transformability of multiple databases allows the operation of a complex computer system that may directly interact with the environment in real time.

Endowed with the D-T-STOR dbms and the IMSA network, the distributed computer system identifies new paradigms and transforms to a new paradigm at key thresholds in real time so as to maintain system dynamism and efficiency. By preserving limited resources, the present invention is able to do more with less computation capacity.

The use of CP-FPGAs allows for a distributed system that can optimize routing processes. When combined with the CP-FPGA hardware, the D-T-STOR dbms becomes an extremely powerful and highly responsive self-organizing system that interacts organically with complex environmental processes.

The D-T-STOR dbms is contrasted with static database systems that behave as large storage systems for complex data inputs and data mining processes.

References to the remaining portions of the specification, including the drawings and claims, will explicate other features and advantages of the present invention. Further features and advantages of the present invention, as well as the structure and operation of various embodiments of the invention, are described in detail below with respect to accompanying drawings, like reference numbers indicate identical or functionally similar elements. Since the present invention has numerous embodiments, it is not the intention herein to restrict the description of the invention to a single embodiment.

The system and methods incorporated in the present invention are implemented by using software program code applied to networks of computers. Specifically, the present invention represents a dynamic adaptive distributed computer system that includes a multi-agent system (MAS). The main embodiment of the distributed computer system is implemented with complex databases. An additional embodiment of the distributed computer system is implemented with continuously programmable field programmable gate array (CP-FPGA) integrated circuits. Whether the main components are primarily constructed of hardware or software, or both, the system incorporates intelligent mobile software agents (IMSAs) within the MAS that organize into groups for problem-solving functions.

A function of the system is to optimize efficiency of a complex database system by continuously reorganizing the system to adapt to changing environmental inputs. The system uses transformational spatio-temporal object relational (T-STOR) databases which continually transform in order to maximize efficiencies while processing large amounts of data inputs and outputs. Distributed T-STOR databases organize a number of nodes in a network. Objects are complex data sets that change in space and time. The D-T-STOR database management system (dbms) is constructed to efficiently order and process complex objects.

The detailed description of the drawings is divided into several parts that explain: (1) The overall system for linking the D-T-STOR dbms with the MAS which manages IMSAs, (2) the process of self-organization of network plasticity that the adaptation of the T-STOR dbms makes possible, (3) the hardware system of continuously programmable FPGAs that implements the system, (4) the T-STOR database, (5) a distributed T-STOR dbms, (6) an IMSA collective interoperation in the MAS, and (7) various applications of the system.

General Architecture and Dynamics

FIG. 1 illustrates the layers of the dynamic adaptive distributed system architecture. The first level shows the hardware for the system. This hardware consists of microprocessors that employ the traditional von Neumann architecture for fetching programming code from memory. In an additional embodiment, integrated circuits (ASICs) are hard wired for increased efficiency in specific applications. In still another embodiment, continuously programmable field programmable gate arrays (CP-FPGAs) benefit from the advantages of both the microprocessor model and the ASIC model by continually restructuring their gate architectures to achieve maximum efficiency for particular tasks.

In the second level, these main computer hardware models are structured in multiple distributed computer nodes. These may be local area network (LAN) or wide area network (WAN) configurations. In general, these distributed computer nodes resemble the GRID computing system.

In the third level, the distributed transformational spatio-temporal object relational (D-T-STOR) database management system (dbms) is organized to be the software platform through which object data sets interoperate. T-STOR databases are present in each of the hardware nodes.

The fourth level consists of the multi-agent system (MAS) within which operates the intelligent mobile software agent (IMSA) collective. The IMSAs use complex software program code to execute specific instructions which perform specific functions. By employing hybrid evolutionary programming techniques and tapping substantial computational resources, IMSAs are capable of automatic programming processes.

On level five the plasticity of intrasystemic self-organizing behavior is evidenced. That is, within the MAS alone, analytic (as distinguished from empirical) decisions are made.

By developing an architecture for the self-organization of complex operations involving interaction with an adaptation to uncertain and changing environments, level six operations order complex plasticity behaviors to extrasystemic interactions.

On level seven a range of functional applications occurs. These applications include: computational resource management and communications resource management applied to optimal routing processes; automated commercial systems; supply chain management systems; global enterprise resource management systems; collective robotic systems; real time simulation and scenario analyses; dynamic sensor networks; dynamic proximity marketing systems; advanced security systems; bioinformatics systems; advanced ubiquitous computing systems; and interoperation of these various systems.

FIG. 2 shows a cluster of T-STOR databases. T-STOR databases 1 (230), 2 (240), 3 (260), 4 (270) and 5 (250) are connected to each other as nodes in a distributed system. The MAS is integrated in the software of the distributed cluster.

FIG. 3 illustrates the database nodes and the MAS. In this figure, environmental inputs (at 300 and 335) interact with the MAS.

FIG. 4 shows intelligent mobile software agents (IMSAs) interoperating within a distributed T-STOR dbms. In this example, IMSA 1 (at 430) is moving into position between databases (at 440). IMSA 2 (at 460) is moving from T-STOR 2 to T-STOR 3 (470). IMSA 3 (at 490) is moving to T-STOR 4 (485), while IMSA 4 (at 480) is moving to T-STOR 2 (450).

The flexible activity between T-STOR databases is illustrated in FIG. 5. The activity between 500 and 530 is most intense, as shown in the number of dotted lines. The activity between 500 and 520 is the next most intense, while the activity between 500 and 540 and between 520 and 540 is successively less intense. The activity between 530 and 540 is less intense yet, while the activity between 520 and 530 is the least intense of the nodes shown here. These relative frequency factors reveal, significantly, the changing intensity between relative connections in the distributed system, and this process, as it changes, illustrates the plasticity of systemic adaptation.

This transformative process is briefly illustrated in FIG. 6. At 600, the initial program parameters are activated. The internal MAS analysis determines the need to modify program parameters (at 610), which are then adapted (at 620). The internal analytical operations of the MAS catalyze the transformation of the system (630) and the adapted program parameters trigger change in the system configuration (640) which finally transforms the system (650).

FIG. 7 shows the simple process of two nodes decreasing frequency intensity over time.

Taken together, these simple processes of plasticity and transformation lead to decreasingly intense and inevitably inactive nodes over time, illustrated in FIG. 8. In the first phase, the increasingly active node connections, namely those between T-STOR 1(800), T-STOR 2 (810) and T-STOR 3 (820), maintain connections while the connections between these nodes and T-STOR 4 (830) become inactive. One sees in the second phase the clear inactivity of T-STOR 4 (890), while the addition of T-STOR 5 (850) and T-STOR 6 (870) creates an increasingly active node distribution system. This process illustrates the plasticity model within a transformative distributed network. With nodes coming on line as they become active and inactive nodes falling away, the system continually adapts.

FIG. 9 shows this plasticity operation whereby nodes with active links become stronger and solidify while weakening others decay and fall away. In illustration 9A, the link between node 910 and node 916 becomes weak as node 916 falls away. Similarly, the links between nodes 905 and 908 are weak. FIG. 9B, node 924 becomes weak, and the link between 924 and 926 falls away. In the meantime, at this same phase in the system, node 940, though weak, is added and linked to 938. Finally, at the phase shown in FIG. 9C, node 924 is removed, while node 964 strengthens, as does the link between 924 and 964. The link between 952 and 956 is also stronger, showing that the nodes are not tenuous. The transformation from the configuration in 9A to the configuration in 9C in the three-part process reveals a clear change in the network structure.

In FIG. 10 a similar network transformation process is illustrated. As shown in phase I, the system begins with initial inputs (at 1000, 1015, 1030 and 1045) that lead to the analytical stage (at 1005, 1020 and 1035) and the initial database storage (1010, 1025 and 1040), which represents the output stage in this example. However, the declining frequency of inputs at 1030 and 1045 leads to a decline in activity at 1035, which leads to a decline at 1040. This in turn leads to a decline of the entire web of connections illustrated in the box in phase II, with 1085, 1090, 1189 and 1095 in decline and inactive. The remaining section of the network is intact. The inputs (1050 and 1065) change, leading to the analysis stage (1055 and 1070) and new database storage configurations (at 1060 and 1080). This example illustrates a simple transformative process utilizing distributive network plasticity processes which adapt the system to changing inputs.

This transformative process is also described in FIG. 11. The dotted ovals on the top right side represent the declining inputs which change the network configuration. This decline in the upper right section of the network shifts emphasis to the active side on the left. As the active network information is input into the T-STOR databases (1150 and 1155 and declining database 1160), these databases transform their structure to improve their performance. Similarly, the databases on the bottom layer of this figure (1165, 1170, 1175 and 1180) are transformed into data inputs from 1150 and 1155 within the distributed network change.

FIG. 12 shows a conjoined hub of T-STOR databases linked to a T-STOR hub. These database network structures constantly change.

While the distributed T-STOR dbms represents a model for a network system transformation process, another model, implemented in hardware, can be observed in the use of distributed CP-FPGAs, which illustrates a similar system process with network plasticity. Designed to change the structure of hardware in the field, an FPGA is an application specific integrated circuit (ASIC) that can be rewired. ASICs have advantages that microprocessors lack; since microprocessors require the generation of new program code from memory to process specific instructions, there is a speed-of-operation disadvantage in completing tasks. On the other hand, an ASIC, though designed to perform a single function rapidly, is limited to a specific task, which similarly restricts its robustness. FPGAs are ASICs that periodically change their structure by rewiring to new configuration ASICs. While the time it takes to rewire is an intermediate disadvantage, FPGAs more than make up for this interval process lag by maintaining the ASIC performance advantages. CP-FPGAs are continuously reprogrammable versions of simpler FPGAs. CP-FPGAs enable computers to continuously rewire as the environment changes, thereby allowing for optimal routing processes.

The present invention uses multiple distributed CP-FPGAs in clusters that may constantly change their structures in order to accommodate specific adaptive features. In FIG. 13, a multi-phasal representation, Phase I shows the relationships between gates (boxes). The connections are numbered in sequence. In this case, the transistors are turned on in order from 1300 to 1305, then 1310, 1325, 1340, 1335, 1130, 1315 and finally 1320. In Phase II, the order of connections is changed. In this second case, the transistors are turned on from 1350 to 1355, then 1370, 1375, 1390, 1385, 1380 and finally 1365. In this example, 1360 is rendered inactive. This may be because the system is seeking to maximize its efficiency or because 1360 is damaged and the system is thereby requiring a reroute of its pathways.

The use of multiple CP-FPGAs in a distributed system is vital to an adaptive system. Whereas most research has been focused on individual or specific FPGAs or CP-FPGAs, their valuable use in distributed systems needs to be further explored. The value of rewiring the architecture of multiple CP-FPGAs may be observed in the example of a dynamic system which requires adaptation to its dynamic routing optimization procedures. FIG. 14 describes this process.

In FIG. 14, routine routing of traffic is in equilibrium (1400) at the initial point of the restructuring process. An analogy to this process might be normal rush-hour traffic in a typical city. However, if an emergency occurs, a high priority entity would need to be routed quickly (1405). In the analogy, a fire truck must take priority over ordinary traffic and its routing sequences. CP-FPGA #1 re-orders from a specific ASIC configuration to another specific ASIC configuration (1410) at a key time to more efficiently reroute the system and enable the higher priority function. In the case of the fire truck, the first traffic light would be changed to accommodate the fire truck's movement and give relatively lower priority to ordinary traffic. The second intersection also gives the truck priority over other traffic. CP-FPGA #2 then re-orders from one specific ASIC configuration to another (1415) in order to more efficiently perform the rerouting task of granting higher priority to the one entity. This process does not involve waiting until the last minute but rather allows the CP-FPGAs to continuously restructure their functions in a sequence that optimizes the processing of the distributed network. Information is forwarded to CP-FPGAs which prompts them to change their structures to preserve the optimal distribute system priority sequencing. Once the emergency concludes, the first CP-FPGA may revert to the original configuration in order to reaccommodate ordinary traffic flows. Other CP-FPGAs reconfigure to custom or ordinary configurations (1420) depending on overall distributed system demand. The fire truck is not slowed by the traffic routing system, because it is given the highest priority, while the other traffic flows are organized to minimize delays as the system continuously reorganizes. The routing between CP-FPGAs optimizes routing for emergencies or high priority demands even at peak traffic times (1425). When the emergency passes, the CP-FPGAs return to the routine configuration of normal routing (1430).

Use of the distributed CP-FPGA network model represents another embodiment of the dynamic adaptive distributed system implemented in hardware rather than software. This unique model sets forth a hard wire approach to system adaptivity and plasticity which may far increase productivity and efficiency of the overall system. Another embodiment yet merges hardware and software plasticity models into a complex hybrid model. This hybrid approach combines the high performance of the hardware with the advantages of transformability of the D-T-STOR dbms.

FIG. 15 illustrates a distributed network configuration of T-STOR databases in which sensor data is input into each network node. The importation of external data sources provides a dynamic stimulus to the operation of the system.

FIG. 16 shows the multi-phasal process of shifting temporal priorities. In Phase I, at the far left of the illustration, data flows are input at 1600 and 1620 at the lowest priority. However, as time continues, at positions 1605 and 1625 the priorities increase. Similarly, the most recent temporal events at 1610 and 1630 further increase in priority until the highest priority is reached at 1615 and 1635 at the most recent time threshold. Temporal dynamics are critical to the plasticity of adaptive systems.

In a static system, categories for storing and organizing data are pre-established and unchanging. In contrast, category structures in the T-STOR database system are dynamic and adaptive. FIG. 17 shows the macro changes over five phases of a category as it grows from phase one (1700) through phases two (1705), three (1710), and four (1715). However, because of its relatively fast growth and large size, the category is restructured into two smaller categories (1720 and 1725). On the other hand, the micro changes of a category, shown on the right side of the illustration, are evolutionary, posing relatively little need to split the category into two or more. Category adaptations are an important part of the T-STOR transformation process because through such changes restructuration processes are performed at specific thresholds. This phenomenon is shown in FIG. 18.

In FIG. 18, database categories grow to reflect environmental change (1800). The categories reach a threshold (1805), as in FIG. 17 at 1715, and the category splits into at least two new categories (1810). After the creation of two new categories, data from the original category is subcategorized by topic (1815) and sorted into the newly created categories (1820). This process is similar to cell-division in biological systems, though in the present system the content of the categories is redistributed. The system undergoes a transformation and self-organizes into a new configuration.

FIG. 19 shows the data repositioning process by temporal priority in a T-STOR database system. Multiple data sources (1900 and 1905) are input into the system via the interface (1907). The inputs are presented to the data router (1910) which inputs the data sets, typically objects which represent adaptive data objects, into the dynamic data storage region (1980). In this example, data is organized by temporal priority from the highest data priority (1930) to the lowest data priority (1970). As the environment changes and temporal priorities change, the dynamic data storage constantly reorders data inputs. Data is output by passing data sets to the data retriever (1920) which is accessed via the interface.

The temporal process of inputting data sets related to an object is illustrated in FIG. 20. In this illustration, an object is in motion from position 2000 to 2040. Data about the object also change. For example, if its position and composition change, data about these changes are input into the system in real time. These data sets are input into the T-STOR dbms (2050).

Objects can be classified into several categories, as seen in the table of FIG. 21. Data sets (2100) and mathematical objects (2105) are construed to be abstract data. Spatial data are either two dimensional (2110) or three dimensional (2115). Finally, temporal data are represented as one dimensional plus time (2120), two dimensional plus time (2125), three dimensional plus time (4D) (2130) and multimedia (2D+time or 3D+time plus additional sense data such as sound) (2135).

Data sets are constantly reordering in our environment as objects and events change position over time. It is possible to represent data sets as objects which change in time and space. The relationships of objects to each other also change. Consequently it is important to reorder objects as computational representations. FIG. 22 illustrates a multiphasal example of the reordering process of objects.

In Phase I, objects are input into the data pipeline in a consecutive sequence, with object 4 in first place (2205), object 3 in second place (2220), object 1 in third place (2210), object 6 in fifth place (2215) and object two in sixth place (2230). Phase II shows that downstream this order is reorganized along new priorities at a different time. As the configuration of the pipeline narrows, the objects are reordered into the sequence presented in Phase II. The third phase configuration restructures the organization of objects from the second phase but maintains their relative positions.

The relevance of object organization to the T-STOR database system is shown in FIG. 23. In Phase I of this illustration, objects are organized by priority, with those at the top left of highest priority and those at bottom right of lowest priority in the transformational database. Thus, object 173 at 2310 has the highest priority, object 174 at 2315 has second highest priority, object 175 at 2320, third highest priority, and object 176 at 2325, the lowest priority illustrated here.

In Phase II of FIG. 23, the positions change. Because the T-STOR dbms is temporal, priorities have changed over time. The transformation has accorded object 175 the highest priority at 2335, while object 174 has dropped position to 2340. Object 176, which has not changed position at 2345 has nevertheless changed priority relative to the other objects in the system. Object 173 has radically changed priority at 2350 and has fallen far behind relative to the other objects.

FIG. 24 is a flow chart that demonstrates the T-STOR transformation process. After the T-STOR database categories restructure into a new typology of categories (2400), data are ordered by topic (2410). The database is reordered into the new category typology according to topical priority (2420). As data are input, the highest (temporal) priority data are reordered (2430). Because data are constantly input and reordered by changing criteria, the T-STOR database is in continual disequilibrium (2440).

Because the D-T-STOR dbms is distributed, data are organized across various nodes. In the same way that a single T-STOR database reorganizes, the D-T-STOR system reorganizes (spatio-temporal) data but does so across spatial position. FIG. 25 is a flow chart that shows the distributed T-STOR transformation process. In the case of two or more T-STOR databases in this example, the databases restructure into a new typology of categories (2500), and data are ordered by topic (2510). Data are reordered into the new category typology according to topical priority (2520) across databases. Data in databases are then ordered by continuously changing (temporal) priority (2530), and the D-T-STOR databases are in continual disequilibrium as they constantly restructure (2540).

FIG. 26 shows the process of splitting an object so as to direct it into different storage locations. At 2600 a block consists of a grid with specified positions at A1, A2, A3, A4, B1, B2, B3 and B4, an object is represented by the sum of the parts contained within the grid markings. Each part of the block marked by a section in the grid is then repositioned into various locations at 2610, 2620, 2630 and 2640. These positions may occur within a single database or among multiple databases in the D-T-STOR dbms, though in the present embodiment they are represented within several separate databases. In this example, A1, A2, A3 and A4 are equally distributed sequentially across the four locations. However, B1 is in db2, B2 in db4, B3 in db1 and B4 in db3. This phase of the process is a snapshot of a complex process of continual repositioning across different locations. To keep track of this complex process of repositioning of objects into the D-T-STOR dbms, it is necessary to tag data sets. This is shown in FIG. 27.

In FIG. 27, a data tagging method is shown for organizing data flows in the D-T-STOR dbms. In this case, three kinds of objects (2700, 2710 and 2720) are organized into sections, with each section containing a specific number. Representations of each object tag are then organized across several databases, with the first object (which consists of tags represented by numbers 1, 2, 3 and 4) being distributed across the four databases in the sequence of 1, 2, 3 and 4. Similarly, the second object (which consists of tags represented by numbers 5, 6, 7 and 8) and the third object (which consists of tags represented by numbers 9, 10, 11 and 12) are also distributed across the four databases in the sequence of 1, 2, 3 and 4.

The D-T-STOR dbms queries objects by accessing their referring data tags. FIG. 28, a single T-STOR database is illustrated with six levels. The first level is the highest priority level and the sixth level is the lowest priority level. Object tags are identified by priority and retrieved in order. The objects and the tags to which they refer are in constant motion over time, reflecting their changing (temporal) priorities. At a point of long-term inactivity, the lowest priority objects (2820) are removed from the active system to long-term data storage (2840) where they are preserved, thereby freeing up data storage capability for the active system. In this figure, objects are queried (2800) and tags are located at position 7, position 173 and position 205.

FIG. 29 captures the data flow process within a single T-STOR database in which multiple data sources are input (2900), data are evaluated by priority (2910) and data are directed to data storage by priority (2920). Data objects are then tagged (2930) and indexed (2940). Given the dynamic nature of the data flows, with the data priorities that change over time and their subsequent repositioning, data indexes that refer to the data tags (2950) constantly change. In fact, the best way to track the changing priorities and locations of the data tags (which refer to the changing data objects) is to access the changing indexes (adaptive hash tables) that refer to the tags.

FIG. 30 shows the relative prioritization of data objects (and their tags) from highest priority (3000) to lowest priority (3050) in consecutive sequence.

The overall system is shown in FIG. 31. In this illustration, rivers of data are input into a single database at 3140. The data sets are the result of interaction with a changing environment. As new data are input into the database, the database continually reorganizes at position two (3145), position three (3150) and position four (3155). Constant interaction with the environment, generates active queries (3135) for continually modifying (reprioritizing) data sets. Episodic queries (3110) occur at different phases (3115, 3120, 3125 and 3130) of the system that reflect access to the system via human-computer interface. These queries reflect brief snapshots of data from the transformation process.

In order for objects to be organized, prioritized, tagged and queried, they need to be evaluated. The flow chart in FIG. 32 shows this process of composite valuation of complex data sets in a D-T-STOR dbms.

In FIG. 32, the temporal evolution of an object is tracked (3200) and data sets are evaluated for priority (3210) and tagged. Data sets are organized into categories (3220), and the categories are structured, ordered in relation to each other and given priorities (3230). A supplementary inventory of categories of object attributes is developed (3240) as the objects develop new attributes that are not captured by the initial category schemata. When new object aspects emerge and new category aspects develop to mirror the new object attributes, categories are split and reordered (3250). A new library of object attributes is resorted to fit into the new categories (3270). As the overall environment changes, the prioritization and representation of objects and object attributes change in the D-T-STOR dbms (3280).

FIG. 33 shows the spatial repositioning of data sets in a D-T-STOR dbms over time. In Phase I, the object attributes are organized in the grid at 3300. The attributes in this example are then divided into A1, A3, A6, B2, B4 and B5 at 3310 and A2, A4, A5, B1, B3 and B6 at 3320. The initial division of the object involves two databases. In Phase II of this process, the object attributes are further reordered into four databases. A2, A3 and B3 (3330) are stored in the first database. A5 and B5 (3340) are stored in the second database. A1, B2 and B6 (3350) are stored in the third database. Finally, A4, A6, B1 and B4 (3360) are stored in the fourth database. Distributing object attributes across multiple databases is useful in order to avoid system outages. By continuously redistributing the objects across multiple databases, the database system remains dynamic. Such dynamic data processing allows the system to optimally route and store complex data sets.

Data sets of object and object attributes are disassembled and reassembled in the D-T-STOR dbms. In Phase I of FIG. 34, two objects in a database at 3400, AB (3410) and CD (3415), are disassembled into A (3425), B (3430), C (3435) and D (3440) at 3420. At a later time, these disassembled data sets are reassembled at 3450 as BC (3455) and AD (3460). Finally, in this example, at 3470, these data sets are disassembled and redistributed into B (3475), C (3480), A (3485) and D (3490).

FIG. 35 illustrates the general transformation process of several databases in a D-T-STOR system with the arrows inside the figures showing the reordering process within each database.

In FIG. 36, the indices of objects that continually change are revealed and the varied positions of objects are shown in a dynamic D-T-STOR dbms. Phase I objects at position 124, position 258 and position 735 (3600) are transformed in Phase I (3610), to position 178, 316 and 963 respectively. In Phase III, the same objects are transformed to position 215, 374 and 978. Finally, in this example, the same objects are further transformed in Phase IV to position 361, 523 and 994 respectively. This example shows a transformation based on the diminishing (temporal) prioritization of objects as they move through the database system.

FIG. 37 shows the relationship between the internal multi-agent system (3730) and the external multi-agent system (3720) as it interacts with the environment. The database system stores data sets that represent objects in the world. As these objects change in the environment, their representations change in the storage system. The two multi-agent systems interact as the external MAS inputs empirical data sets while the internal MAS functions strictly analytical.

The overall MAS that encompasses the external data inputs and the internal data analysis consists of intelligent mobile software agents (IMSAs) that collaborate, cooperate, negotiate and make decisions about collective behaviors. In FIG. 38, two IMSAs, A and B, negotiate in phase one at 3800 and 3810, in phase two at 3820 and 3830 and in phase three at 3840 and 3850, when an agreement for an action is reached at 3860.

In Phase I of FIG. 39 at 3900, the latest information about events is merged with experience about the class of events. At the next phase, at 3910, more information is added to the existing pool of experience. At Phase III, the latest information is added to the system and a scheme is proposed, at 3920, to solve the problem at the horizon of the evolving present. Future prospective scenarios are mapped for the probable success of the solution within various ranges of 20% (3930), 40% (3940) and 80% (3950). This model emulates the Bayesian learning model in that an IMSA may analyze the prospective success of specific schemes as the latest information is added to the sum of information used to analyze a problem.

Of the numerous applications of the present invention, FIG. 40 illustrates the system as it links factories (4010) to natural resources (4000), trading hubs (4020), a shipper (4030), importer (4040), distributor (4050), retailers (4060) and consumers (4070). The invention is additionally useful for organizing information in the supply chain management system that links each entity in the distribution system.

Similarly, in FIG. 41, rings of sub-assembly manufacturing plants (4120) are organized around an assembly plant to provide the most efficient Just-in-Time (JIT) processing of commodities (4100) to meet consumer demand (4140) in real time. Use of the invention reduces the time from realization of demand to supply of products to a minimum. The invention is therefore expedient for enterprise resource planning systems.

Global corporations will be able to organize their operations more efficiently with the present invention. FIG. 42 illustrates a global enterprise resource management system (GERMS). A business's mines (4200) are linked to its factories (4210) which are linked to its bank (4225), shippers (4220), importers (4230), distributors (4240) and retail outlets (4250) which in turn are linked to the consumers (4260). The increasingly complex global system of each business is dynamic and requires the type of increasingly adaptive and efficient management system that the invention embodies.

FIG. 43 is a multi-dimensional illustration of a three dimensional object over time. The object's initial parameters are delineated at the bounded points between A (4300), B (4305), C (4310) and D (4315). However the diagram shows the movement of the object over time to new coordinates which represent the object at bounded points between A' (4320), B' (4325), C' (4330) and D' (4335).

FIG. 44 is a multi-dimensional illustration of representations of groups of three dimensional objects moving through space and time. The three objects, 1 at 4400, 2 at 4410 and 3 at 4420 are represented as three dimensional groups of tuples mapped into a database at a specific point in time, but the three objects are in motion and change position at a later temporal moment to 1' at 4425, 2' at 4430 and 3' at 4435. Since the objects may transform their identity as well as their position, the tuples which change temporal and spatial position and which refer to the same object may not refer to the precisely identical initial object.

FIG. 45 is a multi-dimensional illustration of an object as it moves through a database. The main object is referenced at A (4500). However, the movement of the data reflected by the moving object affects other data sets in the database. As the object changes position, other object representations in the database, at B (4510), C (4520) and D (4530), also change positions. This view illustrates the transformation aspects of a T-STOR database.

FIG. 46 is a multi-dimensional illustration showing object representations of objects moving through four databases in a distributed T-STOR dbms. In database A, an object is represented at 4600; while in database B an object is represented at 4610; at database C an object is represented at 4620; and at database D an object is represented at 4630.

FIG. 47 is a multi-dimensional illustration of multiple objects as they move through a D-T-STOR dbms. In database A, the object is represented at 4705, while the reactions of moving objects to its changing positions are shown at 4700 and 4710. In database B, an object is represented at changing positions at 4720 and the reaction of objects are tracked at 4715 and 4725. In database C, an object is represented in changing positions at trajectory 4735, with the reaction of objects represented at 4730 and 4740. In database D, an object is represented in changing positions at trajectory 4750, with the reaction of objects represented by at 4745 and 4755.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. An adaptive dynamic computer system architecture having a plurality of system layers interconnected to one another, comprising:
    a first layer including a hardware system including microprocessors, application specific integrated circuits or continuously programmable field programmable gate arrays;
    a second layer including distributed nodes;
    a third layer including distributed transformational spatio-temporal object relational database management system;
    a fourth layer including a multi agent system of intelligent mobile software agents;
    a fifth layer including plasticity behavior in intrasystemic interaction;
    a sixth layer including plasticity behavior in environmental interaction;
    a seventh layer including a plurality of functional applications.

* * * * *